United States Patent
Zhang et al.

(10) Patent No.: US 11,375,565 B2
(45) Date of Patent: Jun. 28, 2022

(54) MEASUREMENT CONFIGURATION METHOD, TERMINAL AND BASE STATION

(71) Applicants: China Mobile Communication Co., Ltd Research Institute, Beijing (CN); China Mobile Communications Group Co., Ltd., Beijing (CN)

(72) Inventors: Xiaoran Zhang, Beijing (CN); Na Li, Beijing (CN); Nan Hu, Beijing (CN)

(73) Assignees: China Mobile Communication Ltd., Research Institute, Beijing (CN); China Mobile Communications Corporation, Beiiing (CN)

( * ) Notice: Subject to any disclaimer, the term of this patent is extended or adjusted under 35 U.S.C. 154(b) by 0 days.

(21) Appl. No.: 16/621,870

(22) PCT Filed: Jun. 14, 2018

(86) PCT No.: PCT/CN2018/091258
§ 371 (c)(1),
(2) Date: Dec. 12, 2019

(87) PCT Pub. No.: WO2018/228473
PCT Pub. Date: Dec. 20, 2018

(65) Prior Publication Data
US 2020/0120737 A1 Apr. 16, 2020

(30) Foreign Application Priority Data
Jun. 16, 2017 (CN) .......................... 201710459473.1

(51) Int. Cl.
*H04W 24/10* (2009.01)
*H04W 76/16* (2018.01)
(Continued)

(52) U.S. Cl.
CPC ........... *H04W 76/16* (2018.02); *H04W 24/10* (2013.01); *H04W 36/0058* (2018.08); *H04W 72/0453* (2013.01)

(58) Field of Classification Search
CPC . H04W 76/16; H04W 36/0058; H04W 24/10; H04W 72/0453; H04W 76/28;
(Continued)

(56) References Cited

U.S. PATENT DOCUMENTS

2009/0046641 A1 2/2009 Wang et al.
2012/0113866 A1 5/2012 Tenny et al.
(Continued)

FOREIGN PATENT DOCUMENTS

WO 2016068642 A1 5/2016
WO 2016164782 A1 10/2016
WO 2016038763 A1 6/2017

OTHER PUBLICATIONS

Measurement gap configuration for Dual Connectivity; 3GPP TSG-RAN WG2 Meeting #85bis Valencia, Spain, Mar. 31-Apr. 4, 2014, 6 pages.
(Continued)

*Primary Examiner* — Chuong A Ngo
(74) *Attorney, Agent, or Firm* — Price Heneveld LLP

(57) ABSTRACT

A measurement configuration method, a terminal and a base station are provided. The measurement configuration method includes: receiving a first measurement configuration and a second measurement configuration, wherein the first measurement configuration includes information of a frequency of a first communication system and the second measurement configuration includes information of a frequency of a second communication system; receiving a configured measurement gap configuration.

15 Claims, 13 Drawing Sheets

(51) Int. Cl.
*H04W 36/00* (2009.01)
*H04W 72/04* (2009.01)

(58) Field of Classification Search
CPC . H04W 36/14; H04W 88/06; H04W 36/0088; H04W 24/02; H04W 24/08
See application file for complete search history.

(56) References Cited

U.S. PATENT DOCUMENTS

| | | |
|---|---|---|
| 2013/0242796 A1 | 9/2013 | Chen et al. |
| 2013/0295958 A1 | 11/2013 | Siomina et al. |
| 2015/0327104 A1 | 11/2015 | Yiu et al. |
| 2016/0337893 A1 | 11/2016 | Gheorghiu et al. |
| 2017/0265172 A1 | 9/2017 | Futaki |
| 2018/0077596 A1* | 3/2018 | Huang .................. H04W 24/10 |
| 2018/0332567 A1* | 11/2018 | John Wilson ......... H04L 5/0048 |

OTHER PUBLICATIONS

RRM measurement managed by SN in L TE-NR DC; 3GPP TSG-RAN WG2 #97bis Spokane, USA, Apr. 3-7, 2017, 3 pages.
Summary of email discussion [97bis#10][NR] MN/SN measurement coordination; 3GPP TSG-RAN WG2 #98 May 15-19, 2017 Hangzhou, China; 15 pages.
Discussion on measurement gap; 3GPP Tsg-Ran WG2 Meeting #98 Hangzhou, China, May 15 - 19, 2017; 2 pages.

* cited by examiner

MEASUREMENT CONFIGURATION METHOD, TERMINAL AND BASE STATION

CROSS-REFERENCE TO RELATED APPLICATION

The present application is the U.S. national phase of PCT Application No. PCT/CN2018/091258 filed on Jun. 14, 2018, which claims a priority of the Chinese patent application No. 201710459473.1 filed in China on Jun. 16, 2017, a disclosure of which is incorporated herein by reference in its entirety.

TECHNICAL FIELD

The present disclosure relates to the field of communication technology, in particular to a measurement configuration method, a terminal and a base station.

BACKGROUND

Dual Connectivity (DC) for Different Radio Access Technologies (RATs)

The DC for different RATs may refer to that a terminal is connected to and communicates by means of two different RATs simultaneously, for example, the terminal is connected to a long term evolution (LTE) network and a new radio (NR) network of a 5th generation (5G) mobile communication system simultaneously, namely, the DC between LTE and NR.

When a terminal is provided with the DC for different RATs, each RAT may further be incorporated with carrier aggregation (CA). For example, when a terminal is provided with DC between LTE and 5G NR, a three-carrier aggregation is further enabled for LTE mode and a two-carrier aggregation is enabled for NR.

Measurement Gap

To perform inter-frequency measurement, a terminal has to adjust its radio frequency (RF) channel to a frequency of a to-be-measured object so as to perform the measurement, and during the measurement, data transmission of a serving cell may be interrupted, thus the network needs to configure a measurement gap for the inter-frequency measurement performed by the terminal. Since terminals may have different RF architectures and implementations, measurement gaps may be required for some terminals to perform inter-frequency measurement and not required for some other terminals. When the DC and the carrier aggregation are introduced, the measurement gap may not be configured per terminal (namely User Equipment (UE)), but be configured per component carrier (CC).

Since a terminal may support a significant amount of frequency bands and combinations of frequency bands, in a scenario of the DC for different RATs, if a terminal reports on whether a measurement gap configuration is required for measurement at every supported frequency band and combination of frequency bands, excessive overhead would be incurred.

SUMMARY

According to a first aspect of embodiments of the present disclosure, a measurement configuration method applied to a terminal is provided. The method includes: receiving, from a network side, a first measurement configuration and a second measurement configuration, where the first measurement configuration includes measurement frequency information of a first communication system and the second measurement configuration includes measurement frequency information of a second communication system; receiving, from the network side, a measurement gap configuration.

Optionally, the method further includes: feeding back, to the network side, information as to whether a measurement gap is required for measurement of the frequency of the first communication system and information as to whether a measurement gap is required for measurement of the frequency of the second communication system.

Optionally, the first measurement configuration further includes a request to determine whether a measurement gap is required for the measurement of the frequency of the first communication system, and the second measurement configuration further includes a request to determine whether a measurement gap is required for the measurement of the frequency of the second communication system.

Optionally, the receiving, from the network side, the first measurement configuration and the second measurement configuration includes: receiving the first measurement configuration transmitted by a first base station in the first communication system and receiving the second measurement configuration transmitted by a second base station in the second communication system; the feeding back, to the network side, the information as to whether the measurement gap is required for the measurement of the frequency of the first communication system and the information as to whether the measurement gap is required for the measurement of the frequency of the second communication system includes: feeding back, to the first base station, the information as to whether the measurement gap is required for the measurement of the frequency of the first communication system and feeding back, to the second base station, the information as to whether the measurement gap is required for the measurement of the frequency of the first communication system; the receiving, from the network side, the measurement gap configuration includes: receiving a measurement gap, configured by the first base station, of the measurement of the frequency of the first communication system and receiving a measurement gap, configured by the second base station, of the measurement of the frequency of the second communication system.

Optionally, the receiving, from the network side, the first measurement configuration and the second measurement configuration includes: receiving the first measurement configuration transmitted by a first base station in the first communication system and receiving the second measurement configuration transmitted by a second base station in the second communication system; the feeding back, to the network side, the information as to whether the measurement gap is required for the measurement of the frequency of the first communication system and the information as to whether the measurement gap is required for the measurement of the frequency of the second communication system includes: feeding back, to the first base station, the information as to whether the measurement gap is required for the measurement of the frequency of the first communication system and the information as to whether the measurement gap is required for the measurement of the frequency of the second communication system; the receiving a measurement gap for the measurement of the frequency of the first communication system and a measurement gap for the measurement of the frequency of the second communication system configured by the network side includes: receiving a measurement gap, configured by the first base station, of the measurement of the frequency of the first communication system and a measurement gap, configured by the first base station, of the measurement of the frequency of the second communication system.

Optionally, the method further includes: after a new carrier of the first communication system has been configured by the first base station for the terminal, feeding back, to the first base station, first update information of a measurement gap capability with respect to measurement of a frequency of each carrier; receiving a measurement gap, configured by the first base station for the terminal according to the first update information, of measurement of frequencies of all carriers at a first communication system side.

Optionally, when a measurement gap capability with respect to measurement of a frequency of a carrier at a second communication system side changes, the method further includes: transmitting, to the second base station, second update information as to whether a measurement gap is required for the measurement of the frequency of the second communication system; receiving a measurement gap, configured by the second base station for the terminal according to the second update information, of the measurement of the frequency of the second communication system.

Optionally, when a measurement gap capability with respect to measurement of a frequency of a carrier at a second communication system side changes, the method further includes: transmitting, to the first base station, third update information as to whether a measurement gap is required for the measurement of the frequency of the second communication system; receiving a measurement gap, configured by the first base station for the terminal according to the third update information, of the measurement of the frequency of the second communication system.

Optionally, the receiving, from the network side, the first measurement configuration and the second measurement configuration includes: receiving the first measurement configuration and the second measurement configuration transmitted by a first base station in the first communication system; the feeding back, to the network side, the information as to whether the measurement gap is required for the measurement of the frequency of the first communication system and the information as to whether the measurement gap is required for the measurement of the frequency of the second communication system includes: feeding back, to the first base station, the information as to whether the measurement gap is required for the measurement of the frequency of the first communication system and the information as to whether the measurement gap is required for the measurement of the frequency of the second communication system; the receiving a measurement gap for the measurement of the frequency of the first communication system and a measurement gap for the measurement of the frequency of the second communication system configured by the network side includes: receiving a measurement gap, configured by the first base station, of the measurement of the frequency of the first communication system and a measurement gap, configured by the first base station, of the measurement of the frequency of the second communication system.

Optionally, the method further includes: receiving a third measurement configuration, transmitted by a first base station in the first communication system, configured for measurement of at least a portion of base stations in the second communication system; acquiring a measurement result of at least the portion of base stations in the second communication system through the measurement according to the third measurement configuration, and reporting to the first base station the measurement result; receiving information related to a second base station in the second communication system transmitted by the first base station, where the second base station is selected by the first base station from at least the portion of base stations in the second communication system according to the measurement result; establishing a connection with the second base station in the second communication system, so as to establish for the terminal a DC between the first base station in the first communication system and the second base station in the second communication system.

Optionally, the third measurement configuration includes the measurement frequency information of the second communication system and a measurement gap of the measurement of the frequency of the second communication system; the receiving the third measurement configuration, transmitted by the first base station in the first communication system, configured for measurement of at least the portion of base stations in the second communication system includes: receiving the measurement frequency information of the second communication system and a request to determine whether a measurement gap is required for the measurement of the frequency of the second communication system transmitted by the first base station; transmitting, to the first base station, a feedback result as to whether a measurement gap is required for the measurement of the frequency of the second communication system; receiving a measurement gap of the measurement of the frequency of the second communication system transmitted by the first base station, where the measurement gap of the measurement of the frequency of the second communication system is determined by the first base station according to the feedback result.

According to a second aspect of embodiments of the present disclosure, a measurement configuration method applied to a first base station in a first communication system is further provided. The method includes: transmitting, to a terminal connected to the first base station, a first measurement configuration, where the first measurement configuration includes measurement frequency information of the first communication system; transmitting, to the terminal, a measurement gap configuration.

Optionally, the method further includes: receiving information, fed back by the terminal, as to whether a measurement gap is required for measurement of the frequency of the first communication system.

Optionally, the first measurement configuration further includes a request to determine whether a measurement gap is required for measurement of the frequency of the first communication system.

Optionally, the method further includes: transmitting, to a second base station that is in a second communication system and connected to the terminal, the first measurement configuration, where the first measurement configuration includes the measurement frequency information of the first communication system; receiving, from the second base station in the second communication system, a second measurement configuration, where the second measurement configuration includes measurement frequency information of the second communication system.

Optionally, the method further includes: transmitting, to a second base station that is in a second communication system and connected to the terminal, frequency band information and/or frequency band combination information supported by the terminal in the first communication system; receiving frequency band information and/or frequency band combination information supported by the terminal in the second communication system transmitted by the second base station in the second communication system.

According to a third aspect of embodiments of the present disclosure, a measurement configuration method applied to a first base station in a first communication system is further provided. The method includes: transmitting, to a terminal connected to the first base station, a first measurement configuration, where the first measurement configuration includes measurement frequency information of the first communication system; receiving, from a second base station in a second communication system, a second measurement configuration, where the second measurement configuration includes measurement frequency information of the second communication system; transmitting, to the terminal, a measurement gap configuration.

According to a fourth aspect of embodiments of the present disclosure, a terminal is further provided. The terminal includes: a first receiver, where the first receiver is configured to receive, from a network side, a first measurement configuration and a second measurement configuration, where the first measurement configuration includes information of a frequency of a first communication system and the second measurement configuration includes information of a frequency of a second communication system; the first receiver is further configured to receive, from the network side, a measurement gap configuration.

Optionally, the terminal further includes: a first transmitter, configured to feed back, to the network side, information as to whether a measurement gap is required for measurement of the frequency of the first communication system and information as to whether a measurement gap is required for measurement of the frequency of the second communication system.

Optionally, the first measurement configuration further includes a request to determine whether a measurement gap is required for the measurement of the frequency of the first communication system, and the second measurement configuration further includes a request to determine whether a measurement gap is required for the measurement of the frequency of the second communication system.

Optionally, the first receiver is further configured to receive the first measurement configuration transmitted by a first base station in the first communication system and receive the second measurement configuration transmitted by a second base station in the second communication system; the first transmitter is further configured to feed back, to the first base station, the information as to whether the measurement gap is required for the measurement of the frequency of the first communication system and feed back, to the second base station, the information as to whether the measurement gap is required for the measurement of the frequency of the first communication system; the first receiver is further configured to receive a measurement gap, configured by the first base station, of the measurement of the frequency of the first communication system and receive a measurement gap, configured by the second base station, of the measurement of the frequency of the second communication system.

Optionally, the first receiver is further configured to receive the first measurement configuration transmitted by a first base station in the first communication system and receive the second measurement configuration transmitted by a second base station in the second communication system; the first transmitter is further configured to feed back, to the first base station, the information as to whether the measurement gap is required for the measurement of the frequency of the first communication system and the information as to whether the measurement gap is required for the measurement of the frequency of the second communication system; the first receiver is further configured to receive a measurement gap, configured by the first base station, of the measurement of the frequency of the first communication system and a measurement gap, configured by the first base station, of the measurement of the frequency of the second communication system.

Optionally, the first transmitter is further configured to, after a new carrier of the first communication system has been configured by the first base station for the terminal, feed back, to the first base station, first update information of a measurement gap capability with respect to measurement of a frequency of each carrier; the first receiver is further configured to receive a measurement gap, configured by the first base station for the terminal according to the first update information, of measurement of frequencies of all carriers at a first communication system side.

Optionally, the first transmitter is further configured to transmit, to the second base station, second update information as to whether a measurement gap is required at a second communication system side; the first receiver is further configured to receive a measurement gap, configured by the second base station for the terminal according to the second update information, of the measurement of the frequency of the second communication system.

Optionally, the first transmitter is further configured to transmit, to the first base station, third update information as to whether a measurement gap is required at a second communication system side; the first receiver is further configured to receive a measurement gap, configured by the first base station for the terminal according to the third update information, of the measurement of the frequency of the second communication system.

Optionally, the first receiver is further configured to receive the first measurement configuration and the second measurement configuration transmitted by a first base station in the first communication system; the first transmitter is further configured to feed back, to the first base station, the information as to whether the measurement gap is required for the measurement of the frequency of the first communication system and the information as to whether the measurement gap is required for the measurement of the frequency of the second communication system; the first receiver is further configured to receive a measurement gap, configured by the first base station, of the measurement of the frequency of the first communication system and a measurement gap, configured by the first base station, of the measurement of the frequency of the second communication system.

Optionally, the first receiver is further configured to receive a third measurement configuration, transmitted by a first base station in the first communication system, configured for measurement of at least a portion of base stations in the second communication system; the first transmitter is further configured to acquire a measurement result of at least the portion of base stations in the second communication system through the measurement according to the third measurement configuration, and report to the first base station the measurement result; the first receiver is further configured to receive information related to a second base station in the second communication system transmitted by the first base station, where the second base station is selected by the first base station from at least the portion of base stations in the second communication system according to the measurement result; and establish a connection with the second base station in the second communication system, so as to establish for the terminal a DC between the first base station in the first communication system and the second base station in the second communication system.

Optionally, the first receiver is further configured to receive the information of the frequency of the second communication system and a request to determine whether a measurement gap is required for the measurement of the frequency of the second communication system transmitted by the first base station; the first transmitter is further configured to transmit, to the first base station, a feedback result as to whether a measurement gap is required for the measurement of the frequency of the second communication system; the first receiver is further configured to receive a measurement gap of the measurement of the frequency of the second communication system transmitted by the first base station, where the measurement gap of the measurement of the frequency of the second communication system is determined by the first base station according to the feedback result.

According to a fifth aspect of embodiments of the present disclosure, a first base station is further provided. The first base station includes: a second transmitter, where the second transmitter is configured to transmit, to a terminal connected to the first base station, a first measurement configuration, where the first measurement configuration includes measurement frequency information of the first communication system; the second transmitter is further configured to transmit, to the terminal, a measurement gap of measurement of the frequency of the first communication system.

Optionally, the first base station further includes: a second receiver, configured to receive information, fed back by the terminal, as to whether a measurement gap is required for measurement of the frequency of the first communication system.

Optionally, the first measurement configuration further includes a request to determine whether a measurement gap is required for measurement of the frequency of the first communication system.

Optionally, the second transmitter is further configured to transmit, to a second base station that is in a second communication system and connected to the terminal, the first measurement configuration; the second receiver is further configured to receive, from the second base station in the second communication system, a second measurement configuration, where the second measurement configuration includes measurement frequency information of the second communication system.

Optionally, the second transmitter is further configured to transmit, to a second base station that is in a second communication system and connected to the terminal, frequency band information and/or frequency band combination information supported by the terminal in the first communication system; the second receiver is further configured to receive frequency band information and/or frequency band combination information supported by the terminal in the second communication system transmitted by the second base station in the second communication system.

According to a sixth aspect of embodiments of the present disclosure, a first base station is further provided. The first base station includes: a third transmitter, configured to transmit, to a terminal connected to the first base station, a first measurement configuration, where the first measurement configuration includes measurement frequency information of the first communication system; a third receiver, configured to receive, from a second base station in a second communication system, a second measurement configuration, where the second measurement configuration includes measurement frequency information of the second communication system; where the third transmitter is further configured to transmit, to the terminal, a measurement gap configuration.

According to a seventh aspect of embodiments of the present disclosure, a terminal is further provided. The terminal includes: a memory, a processor and a computer program stored in the memory and configured to be executed by the processor, where the processor is configured to execute the computer program, to implement steps of the aforementioned measurement configuration method.

According to an eighth aspect of embodiments of the present disclosure, a base station is further provided. The base station includes: a memory, a processor and a computer program stored in the memory and configured to be executed by the processor, where the processor is configured to execute the computer program, to implement steps of the aforementioned measurement configuration method.

According to a ninth aspect of embodiments of the present disclosure, a computer readable storage medium is further provided. The computer readable storage medium stores therein a data transmission program, where the data transmission program is configured to be executed by a processor, to implement steps of the aforementioned measurement configuration method.

DETAILED DESCRIPTION

Hereinafter, the exemplary embodiments of the present disclosure are described in detail with reference to the accompanying drawings. Although the exemplary embodiments of the present disclosure are illustrated in the accompanying drawings, the disclosure may, however, be embodied in many different forms and should not be construed as being limited to the embodiments set forth herein. Rather, these embodiments are provided so that the present disclosure will be thorough, and will fully convey the scope of the present disclosure to those skilled in the art.

Figure 1:
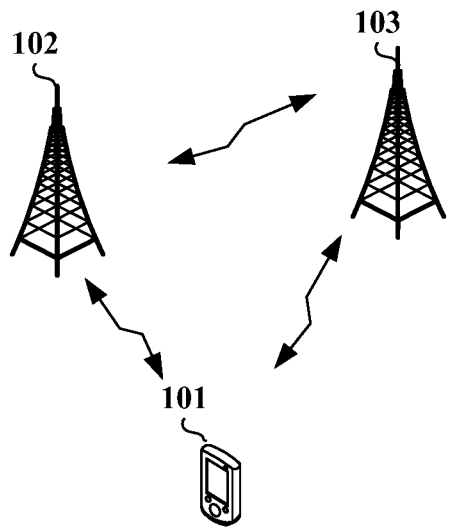
FIG. 1 is a schematic diagram of a system architecture to which a measurement configuration method of a terminal of DC for different RATs provided by the present disclosure may be applied.

FIG. 1 is a schematic diagram of a system architecture to which a measurement configuration method of a terminal of DC for different RATs provided by the present disclosure may be applied. As shown in FIG. 1, the system architecture provided by this embodiment includes: a terminal 101, a first base station 102 in a first communication system and a second base station 103 in a second communication system. The first communication system and the second communication system employ different RATs, e.g., the first communication system employs LTE technology while the second communication system employs 5G NR technology. The terminal 101 establishes a DC to the first base station 102 (e.g., eNB in LTE) and the second base station 103 (e.g., gNB in 5G NR).

For example, the first base station 102 or the second base station 103 may be a base transceiver station (BTS) in a global system of mobile communication (GSM) or a code division multiple access (CDMA) system, or a Node B (NB) in a wideband code division multiple access (WCDMA) system, or an evolutional Node B (eNB or eNodeB) in an LTE system, or a base station in a new radio access technology (New RAT or NR) system, or a relay station or access point, or a base station in a future 5G network, and is not limited herein.

The terminal 101 may be a wireless terminal or a wired terminal. A wireless terminal may refer to a device used to provide voice and/or other service data connectivity to a user, a hand-held device with a wireless connection function, or another processing device connected to a wireless modem. A wireless terminal may communicate with one or more core networks via a radio access network (RAN). The wireless terminal may be a mobile terminal, such as a mobile phone (also called cellphone) or a computer equipped with a mobile terminal, such as a portable, pocket-sized, hand-held, computer built-in, or vehicle-mounted mobile device, which exchanges voice and/or data with the radio access network. For example, it may be a personal communication service (PCS) phone, a cordless phone, a session initiation protocol (SIP) phone, a wireless local loop (WLL) station, a personal digital assistant (PDA), or the like. A wireless terminal may also be referred to as a system, a subscriber unit, a subscriber station, a mobile station, a mobile, a remote station, a remote terminal, an access terminal, a user terminal, a user agent, or a user device or user equipment, and is not limited herein.

Figure 2:
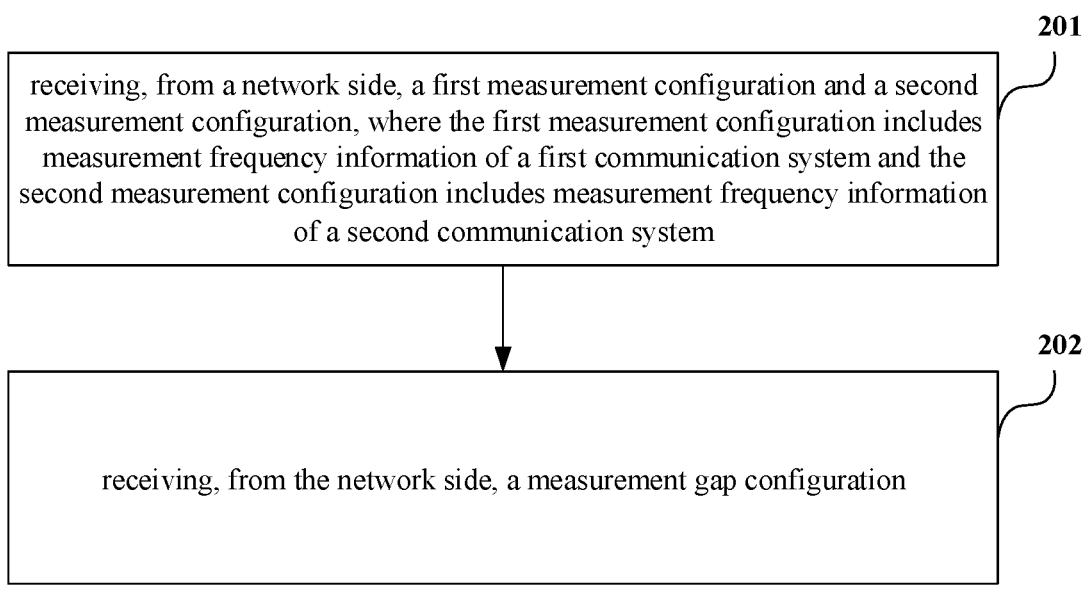
FIG. 2 is a flow diagram of a measurement configuration method provided by an embodiment of the present disclosure.

FIG. 2 is a flow diagram of a measurement configuration method provided by an embodiment of the present disclosure. The method is performed by a terminal and includes following steps.

Step 201: receiving, from a network side, a first measurement configuration and a second measurement configuration, where the first measurement configuration includes measurement frequency information of a first communication system and the second measurement configuration includes measurement frequency information of a second communication system.

Step 202: receiving, from the network side, a measurement gap configuration.

Optionally, the measurement gap configuration includes: a measurement gap of a measurement of the frequency of the first communication system and a measurement gap of a measurement of the frequency of the second communication system.

In an implementation of this embodiment, the terminal may receive a measurement configuration transmitted by the network side, the network side may inquire the terminal about whether a measurement gap is required. The terminal determines whether a measurement gap is required and gives feedback to the network side. Then the terminal receives a measurement gap transmitted by the network side that is configured by the network side according to the terminal's feedback on whether a measurement gap is required. Finally the terminal performs measurement according to the received measurement configuration and measurement gap.

In another implementation of this embodiment, the terminal receives the measurement configuration and measurement gap configured by the network side. The measurement gap is determined by the network side according to frequency bands and frequency band combinations supported by the terminal in various communication systems. Finally, the terminal performs measurement according to the received measurement configuration and measurement gap.

In this embodiment, the terminal performs measurement according to the measurement gap and the received measurement configuration configured by the network side. The measurement gap may be determined by the terminal, or may be configured by the network side, thereby reducing effectively the signaling overhead associated with reporting the measurement capability by the terminal, and preventing the excessive signaling overhead resulting from the necessity for the terminal to report the measurement capability with respect to all supported frequency bands and frequency band combinations.

Figure 3:
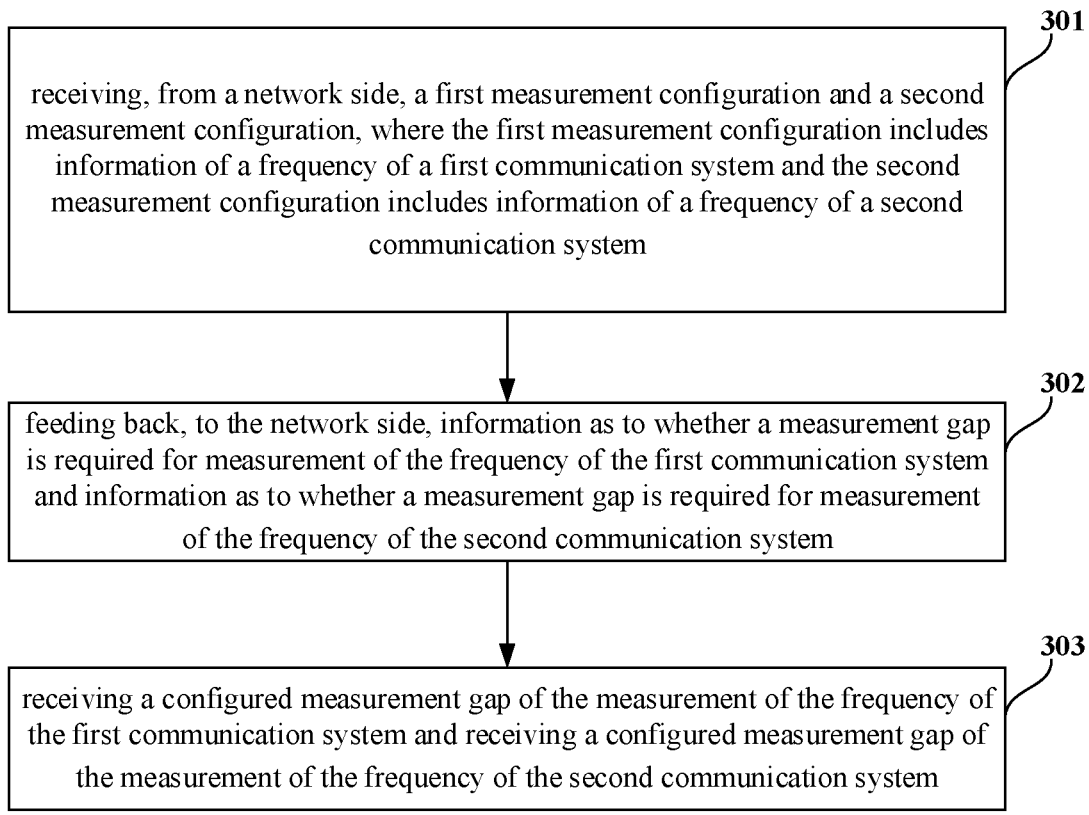
FIG. 3 is a flow diagram of a measurement configuration method provided by another embodiment of the present disclosure.

FIG. 3 is a flow diagram of a measurement configuration method provided by another embodiment of the present disclosure. The method is performed by a terminal (or UE) and, as shown in FIG. 3, includes following steps.

Step 301: receiving, from a network side, a first measurement configuration and a second measurement configuration.

The first measurement configuration includes information of a frequency of a first communication system and the second measurement configuration includes information of a frequency of a second communication system. Optionally, the first measurement configuration further includes a request to determine whether a measurement gap is required for the measurement of the frequency of the first communication system, and the second measurement configuration further includes a request to determine whether a measurement gap is required for the measurement of the frequency of the second communication system.

The first communication system and the second communication system employ different RATs. For example, the first communication system employs LTE technology and the second communication system employs 5G NR technology, or vice versa. It should be appreciated that the present disclosure is not limited thereto.

Step 302: feeding back, to the network side, information as to whether a measurement gap is required for measurement of the frequency of the first communication system and information as to whether a measurement gap is required for measurement of the frequency of the second communication system.

In this step, UE may configure the measurement gap of the first communication system and the measurement gap of the second communication system in coordination according to the request to determine whether a measurement gap is required for the measurement of the frequency of the first communication system and the request to determine whether a measurement gap is required for the measurement of the frequency of the second communication system, to acquire the information as to whether a measurement gap is required for the measurement of the frequency of the first communication system and the information as to whether a measurement gap is required for the measurement of the frequency of the second communication system, thereby preventing the measurement gap of the first communication system from impacting the second communication system, or preventing the measurement gap of the second communication system from impacting the first communication system.

For example, the UE feeds back on whether a measurement gap is required for the measurement of the frequency of an LTE system, and feeds back on whether a measurement gap is required for the measurement of the frequency of a 5G NR system.

Step 303: receiving a configured measurement gap of the measurement of the frequency of the first communication system and receiving a configured measurement gap of the measurement of the frequency of the second communication system.

The measurement gap of the measurement of the frequency of the first communication system includes: a measurement gap for measuring at a frequency of the first communication system and a measurement gap for measuring at a frequency of the second communication system. For example, the two measurement gaps may be one measurement gap, and when no measurement gap is required, the length of the measurement gap may be set to 0.

The measurement gap of the measurement of the frequency of the second communication system includes: a measurement gap for measuring at a frequency of the second communication system and a measurement gap for measuring at a frequency of the first communication system. For example, the two measurement gaps may be one measurement gap, and when no measurement gap is required, the length of the measurement gap may be set to 0.

The measurement gap of the measurement of the frequency of the first communication system in this step is configured by network side equipment based on the information, fed back by the UE, as to whether a measurement gap is required for the measurement of the frequency of the first communication system.

The measurement gap of the measurement of the frequency of the second communication system in this step is configured by network side equipment based on the information, fed back by the UE, as to whether a measurement gap is required for the measurement of the frequency of the second communication system.

In this embodiment, the UE configures the measurement gap of the first communication system and the measurement gap of the second communication system in coordination according to the request to determine whether a measurement gap is required for the measurement of the frequency of the first communication system and to determine whether a measurement gap is required for the measurement of the frequency of the second communication system, then feeds back information as to whether a measurement gap is required for measurement of the frequency of the first communication system and information as to whether a measurement gap is required for the second communication system, and finally receives a measurement gap of the measurement of the frequency of the first communication system and a measurement gap of the measurement of the frequency of the second communication system configured according to the information as to whether a measurement gap is required for measurement of the frequency of the first communication system and whether a measurement gap is required for measurement of the frequency of the second communication system fed back by the UE. Thereby, on one hand, the measurement gap of the first communication system is prevented from impacting the second communication system, or the measurement gap of the second communication system is prevented from impacting the first communication system; on the other hand, the excessive signaling overhead, resulting from reporting, by UE, on whether the measurement gap is required for measurement of the frequency at every supported frequency band and frequency band combination, is avoided.

Figure 4:
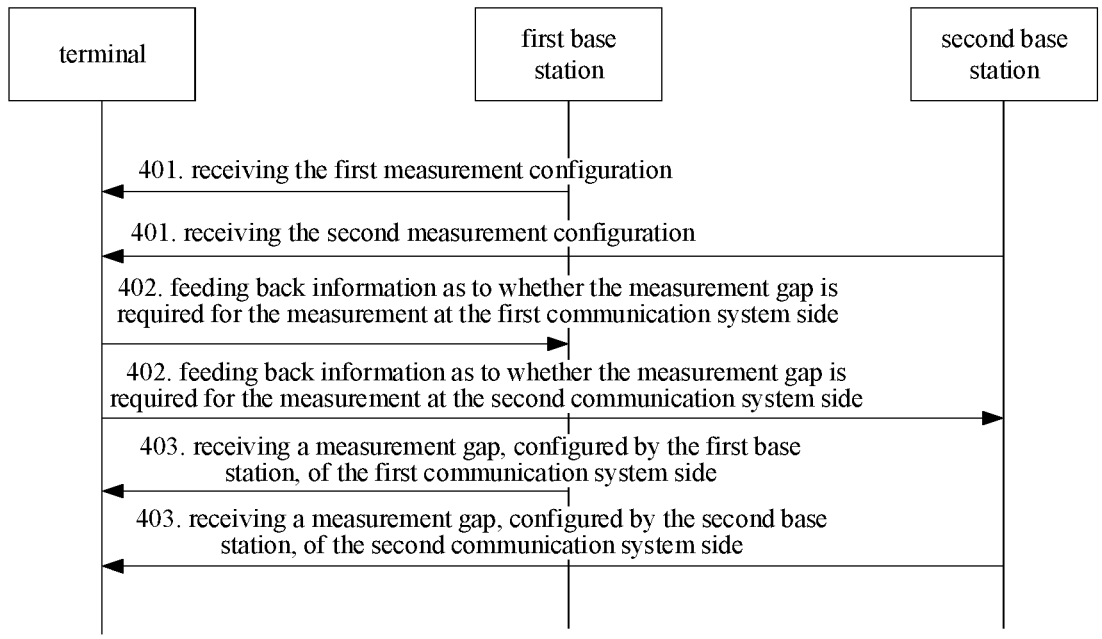
FIG. 4 is a flow diagram of a measurement configuration method provided by yet another embodiment of the present disclosure.

FIG. 4 is a flow diagram of a measurement configuration method of a terminal of DC for different RATs provided by yet another embodiment of the present disclosure. As shown in FIG. 4, the method includes following steps.

Step 401: receiving the first measurement configuration transmitted by a first base station in the first communication system and receiving the second measurement configuration transmitted by a second base station in the second communication system.

The first measurement configuration includes information of a frequency of a first communication system and a request to determine whether a measurement gap is required for the measurement of the frequency of the first communication system; and the second measurement configuration includes information of a frequency of a second communication system and a request to determine whether a measurement gap is required for the measurement of the frequency of the second communication system.

The first communication system and the second communication system employ different RATs. For example, the first communication system is an LTE system and the second communication system is a 5G NR system. It should be appreciated that the present disclosure is not limited thereto.

Step 402: feeding back, to the first base station, information as to whether the measurement gap is required for the measurement of the frequency of the first communication system and feeding back, to the second base station, information as to whether the measurement gap is required for the measurement of the frequency of the first communication system.

The information as to whether the measurement gap is required for the measurement of the frequency of the first communication system includes: information as to whether a measurement gap is required for measuring at a frequency of the first communication system, and information as to whether a measurement gap is required for measuring at a frequency of the second communication system.

The information as to whether the measurement gap is required for the measurement of the frequency of the second communication system includes: information as to whether a measurement gap is required for measuring at a frequency of the second communication system, and information as to whether a measurement gap is required for measuring at a frequency of the first communication system. In this step, the UE may configure the measurement gap of the first communication system and the measurement gap of the second communication system in coordination according to the request to determine whether a measurement gap is required for the measurement of the frequency of the first communication system and the request to determine whether a measurement gap is required for the measurement of the frequency of the second communication system, to acquire the information as to whether a measurement gap is required for the measurement of the frequency of the first communication system and the information as to whether a measurement gap is required for the measurement of the frequency of the second communication system, thereby preventing the measurement gap of the first communication system from impacting the second communication system, or preventing the measurement gap of the second communication system from impacting the first communication system.

For example, the UE feeds back, to the eNB, on whether a measurement gap is required for the measurement of the frequency of an LTE system, and feeds back, to the gNB, on whether a measurement gap is required for the measurement of the frequency of a 5G NR system.

Step 403: receiving a measurement gap, configured by the first base station, of the measurement of the frequency of the first communication system and receiving a measurement gap, configured by the second base station, of the measurement of the frequency of the second communication system.

The measurement gap of the measurement of the frequency of the first communication system in this step is configured by the first base station based on the information, fed back by the UE, as to whether a measurement gap is required for the measurement of the frequency of the first communication system. The measurement gap, configured by the first base station for the UE, of the measurement of the frequency of the first communication system includes: a measurement gap for measuring at a frequency of the first communication system and a measurement gap for measuring at a frequency of the second communication system. For example, the two measurement gaps may be one measurement gap, and when no measurement gap is required, the length of the measurement gap may be set to 0.

The measurement gap of the measurement of the frequency of the second communication system in this step is configured by the second base station based on the information, fed back by the UE, as to whether a measurement gap is required for the measurement of the frequency of the second communication system. The measurement gap, configured by the second base station for the UE, of the measurement of the frequency of the second communication system includes: a measurement gap for measuring at a frequency of the second communication system and a measurement gap for measuring at a frequency of the first communication system. For example, the two measurement gaps may be one measurement gap, and when no measurement gap is required, the length of the measurement gap may be set to 0.

In this embodiment, UE configures the measurement gap of the first communication system and the measurement gap of the second communication system in coordination according to the request to determine whether a measurement gap is required for the measurement of the frequency of the first communication system and to determine whether a measurement gap is required for the measurement of the frequency of the second communication system, then feeds back information as to whether a measurement gap is required for measurement of the frequency of the first communication system and information as to whether a measurement gap is required for the second communication system, and finally receives a measurement gap of the measurement of the frequency of the first communication system and a measurement gap of the measurement of the frequency of the second communication system configured according to the information as to whether a measurement gap is required for measurement of the frequency of the first communication system and whether a measurement gap is required for measurement of the frequency of the second communication system fed back by the UE. Thereby, on one hand, the measurement gap of the first communication system is prevented from impacting the second communication system, or the measurement gap of the second communication system is prevented from impacting the first communication system; on the other hand, the excessive signaling overhead, resulting from reporting, by UE, on whether the measurement gap is required for measurement of the frequency at every supported frequency band and frequency band combination, is avoided.

Figure 5:
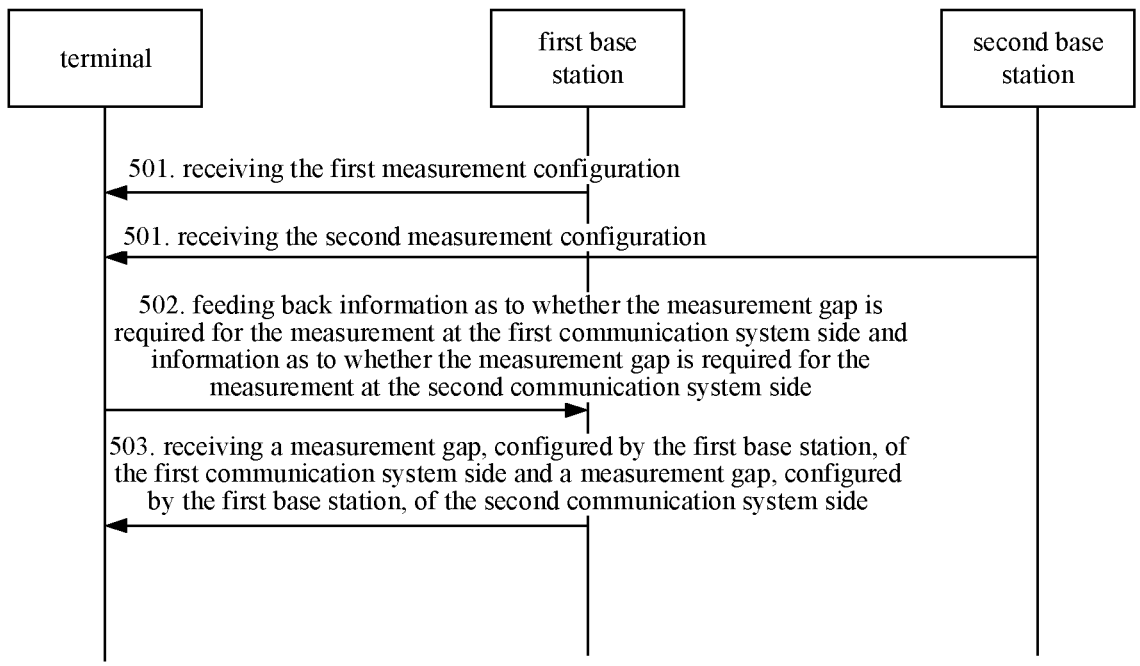
FIG. 5 is a flow diagram of a measurement configuration method provided by still another embodiment of the present disclosure.

FIG. 5 is a flow diagram of a measurement configuration method of a terminal of DC for different RATs provided by still another embodiment of the present disclosure. As shown in FIG. 5, the method includes following steps.

Step 501: receiving the first measurement configuration transmitted by a first base station in the first communication system and receiving the second measurement configuration transmitted by a second base station in the second communication system.

The first measurement configuration includes information of a frequency of a first communication system and a request to determine whether a measurement gap is required for the measurement of the frequency of the first communication system; and the second measurement configuration includes information of a frequency of a second communication system and a request to determine whether a measurement gap is required for the measurement of the frequency of the second communication system.

The first communication system and the second communication system employ different RATs. For example, the first communication system is an LTE system and the second communication system is a 5G NR system. It should be appreciated that the present disclosure is not limited thereto.

Step 502: feeding back, to the first base station, information as to whether the measurement gap is required for the measurement of the frequency of the first communication system and information as to whether the measurement gap is required for the measurement of the frequency of the second communication system.

The information as to whether the measurement gap is required for the measurement of the frequency of the first communication system includes: information as to whether a measurement gap is required for measuring at a frequency of the first communication system, and information as to whether a measurement gap is required for measuring at a frequency of the second communication system.

The information as to whether the measurement gap is required for the measurement of the frequency of the second communication system includes: information as to whether a measurement gap is required for measuring at a frequency of the second communication system, and information as to whether a measurement gap is required for measuring at a frequency of the first communication system.

In this step, UE may configure the measurement gap of the first communication system and the measurement gap of the second communication system in coordination according to the request to determine whether a measurement gap is required for the measurement of the frequency of the first communication system and the request to determine whether a measurement gap is required for the measurement of the frequency of the second communication system, to acquire the information as to whether a measurement gap is required for the measurement of the frequency of the first communication system and the information as to whether a measurement gap is required for the measurement of the frequency of the second communication system, thereby preventing the measurement gap of the first communication system from impacting the second communication system, or preventing the measurement gap of the second communication system from impacting the first communication system.

Step 503: receiving a measurement gap, configured by the first base station, of the measurement of the frequency of the first communication system and a measurement gap, configured by the first base station, of the measurement of the frequency of the second communication system.

Optionally, the measurement gap, configured by the first base station for the UE, of the measurement of the frequency of the first communication system includes: a measurement gap for measuring at a frequency of the first communication system and a measurement gap for measuring at a frequency of the second communication system. The two measurement gaps may be one measurement gap, and when no measurement gap is required, the length of the measurement gap may be set to 0.

Optionally, the measurement gap, configured by the first base station for the UE, of the measurement of the frequency of the second communication system includes: a measurement gap for measuring at a frequency of the second communication system and a measurement gap for measuring at a frequency of the first communication system. The two measurement gaps may be one measurement gap, and when no measurement gap is required, the length of the measurement gap may be set to 0.

The first base station transmits the configured measurement gap of the measurement of the frequency of the second communication system to the second base station.

In this embodiment, UE configures the measurement gap of the first communication system and the measurement gap of the second communication system in coordination according to the request to determine whether a measurement gap is required for the measurement of the frequency of the first communication system and the request to determine whether a measurement gap is required for the measurement of the frequency of the second communication system, then feeds back information as to whether a measurement gap is required for measurement of the frequency of the first communication system and information as to whether a measurement gap is required for measurement of the frequency of the second communication system, and finally receives a measurement gap of the measurement of the frequency of the first communication system and a measurement gap of the measurement of the frequency of the second communication system configured according to the information as to whether a measurement gap is required for measurement of the frequency of the first communication system and whether a measurement gap is required for measurement of the frequency of the second communication system fed back by the UE. Thereby, on one hand, the measurement gap of the first communication system is prevented from impacting the second communication system, or the measurement gap of the second communication system is prevented from impacting the first communication system; on the other hand, the excessive signaling overhead, resulting from reporting, by UE, on whether the measurement gap is required for measurement of the frequency at every supported frequency band and frequency band combination, is avoided.

When the DC for different RATs is coupled with carrier aggregation, the communication systems in the different RATs may each employ carrier aggregation. The addition of a CA secondary carrier may have an impact on the usage and configuration of the measurement gap at a frequency, thus it is necessary for the first base station and the second base station to re-negotiate and acquire the measurement capability of the terminal. In following embodiment, the first base station may be an eNB and the second base station may be a gNB, or the first base station may be a gNB and the second base station may be an eNB.

Figure 6:
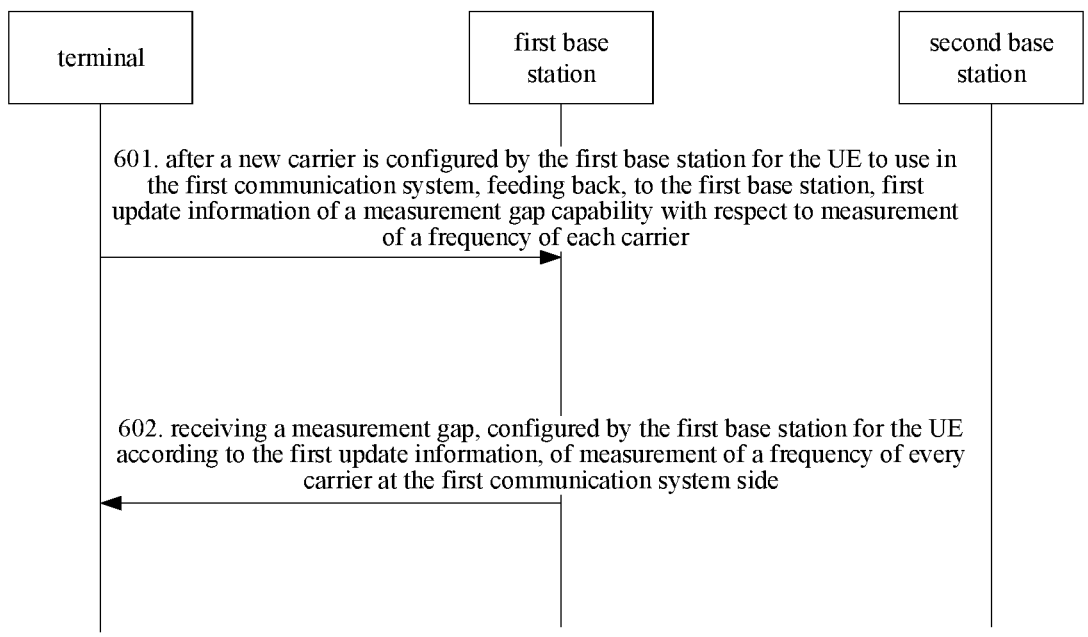
FIG. 6 is a flow diagram of a measurement configuration method provided by still another embodiment of the present disclosure.

Referring to FIG. 6, on the basis of FIG. 4 or FIG. 5, the method further includes following step.

Step 601: after a new carrier has been configured by the first base station for the UE to use in the first communication system, feeding back, to the first base station, first update information of a measurement gap capability with respect to measurement of a frequency of each carrier.

The new carrier is a newly added secondary carrier. Each of the carriers includes the newly added secondary carrier and an original primary carrier.

Specifically, (1) UE feeds back, to the first base station, information as to whether a measurement gap is required for measurement of the newly added carrier at the first communication system side. The information includes: information as to whether a measurement gap is required for measuring at a frequency of the first communication system, and information as to whether a measurement gap is required for measuring at a frequency of the second communication system.

(2) When a measurement gap capability with respect to a primary carrier changes, the UE feeds back, to the first base station, an information update as to whether a measurement gap is required for the original primary carrier at the first communication system side. The information update includes: information as to whether a measurement gap is required for measuring at a frequency of the first communication system, and information as to whether a measurement gap is required for measuring at a frequency of the second communication system.

Step 602: receiving a measurement gap, configured by the first base station for the UE according to the first update information, of measurement of a frequency of every carrier at the first communication system side.

The carriers may include: a primary carrier and a newly added secondary carrier.

The first base station configures for the UE, according to information updated by the UE, measurement gaps of the primary carrier and the newly added secondary carrier at the first communication side respectively. The measurement gaps include: a measurement gap for measuring at a frequency of the first communication system and a measurement gap for measuring at a frequency of the second communication system. The two measurement gaps may be one measurement gap.

According to this embodiment, a re-negotiation and acquisition of the measurement capability of the terminal by the first base station and the second base station in the DC for different RATs and CA scenario is achieved, thereby the measurement gap configuration is optimized and measurement overhead is reduced.

Figure 7:
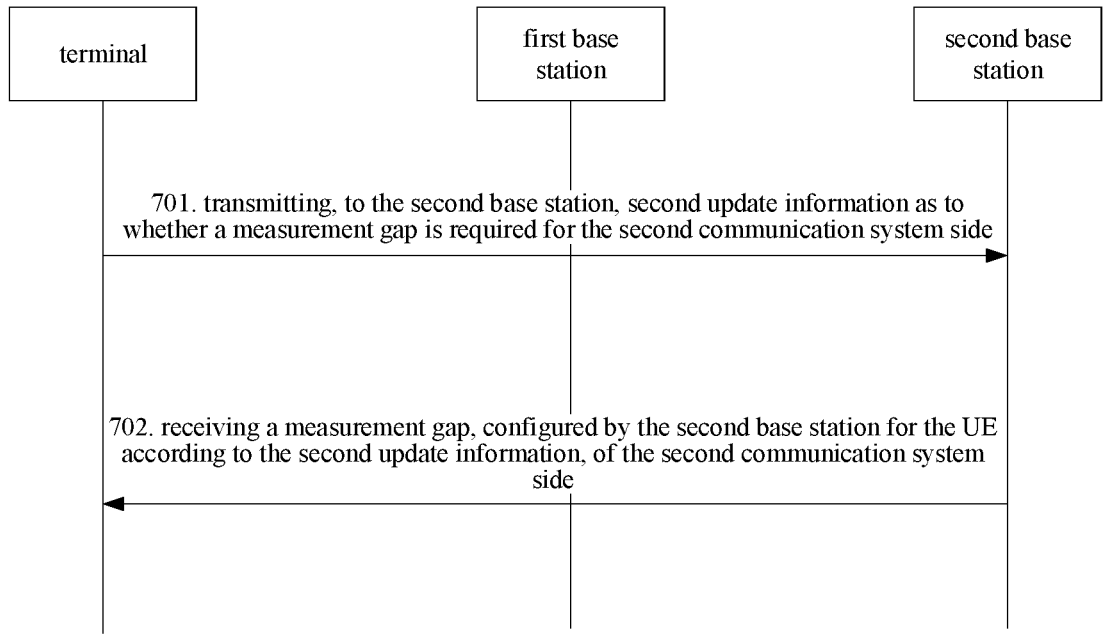
FIG. 7 is a flow diagram of a measurement configuration method provided by still another embodiment of the present disclosure.

Referring to FIG. 7, on the basis of FIG. 6, when a measurement gap capability with respect to measurement of a frequency of a carrier at a second communication system side changes, the method further includes following steps.

Step 701: transmitting, to the second base station, second update information as to whether a measurement gap is required for the second communication system side.

The second update information includes: information as to whether a measurement gap is required for measuring at a frequency of the first communication system, and information as to whether a measurement gap is required for measuring at a frequency of the second communication system.

Step 702: receiving a measurement gap, configured by the second base station for the terminal according to the second update information, of the measurement of the frequency of the second communication system.

The measurement gap of the measurement of the frequency of the second communication system includes: a measurement gap for measuring at a frequency of the first communication system and a measurement gap for measuring at a frequency of the second communication system.

According to this embodiment, a re-negotiation and acquisition of the measurement capability of the terminal by the first base station and the second base station in the DC for different RATs and CA scenario is achieved, thereby the measurement gap configuration is optimized and measurement overhead is reduced.

Figure 8:
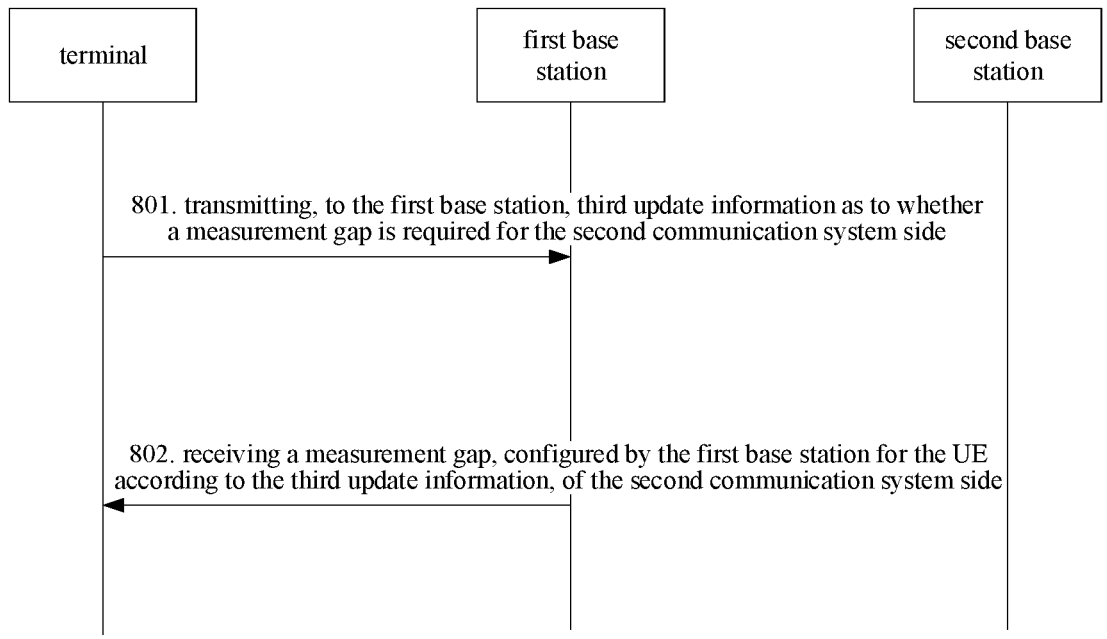
FIG. 8 is a flow diagram of a measurement configuration method provided by still another embodiment of the present disclosure.

Referring to FIG. 8, on the basis of FIG. 6, when a measurement gap capability with respect to measurement of a frequency of a carrier at a second communication system side changes, the method further includes following steps.

Step 801: transmitting, to the first base station, third update information as to whether a measurement gap is required for the second communication system side.

The third update information includes: information as to whether a measurement gap is required for measuring at a frequency of the first communication system, and information as to whether a measurement gap is required for measuring at a frequency of the second communication system.

Step 802: receiving a measurement gap, configured by the first base station for the UE according to the third update information, of the measurement of the frequency of the second communication system.

The measurement gap of the measurement of the frequency of the second communication system configured for the UE includes: a measurement gap for measuring at a frequency of the first communication system and a measurement gap for measuring at a frequency of the second communication system. The two measurement gaps may be one measurement gap. In this embodiment, the measurement gap of the measurement of the frequency of the second communication system is informed by the first base station to the second base station.

According to this embodiment, a re-negotiation and acquisition of the measurement capability of the terminal by the first base station and the second base station in the DC for different RATs and CA scenario is achieved, thereby the measurement gap configuration is optimized and measurement overhead is reduced.

Figure 9:
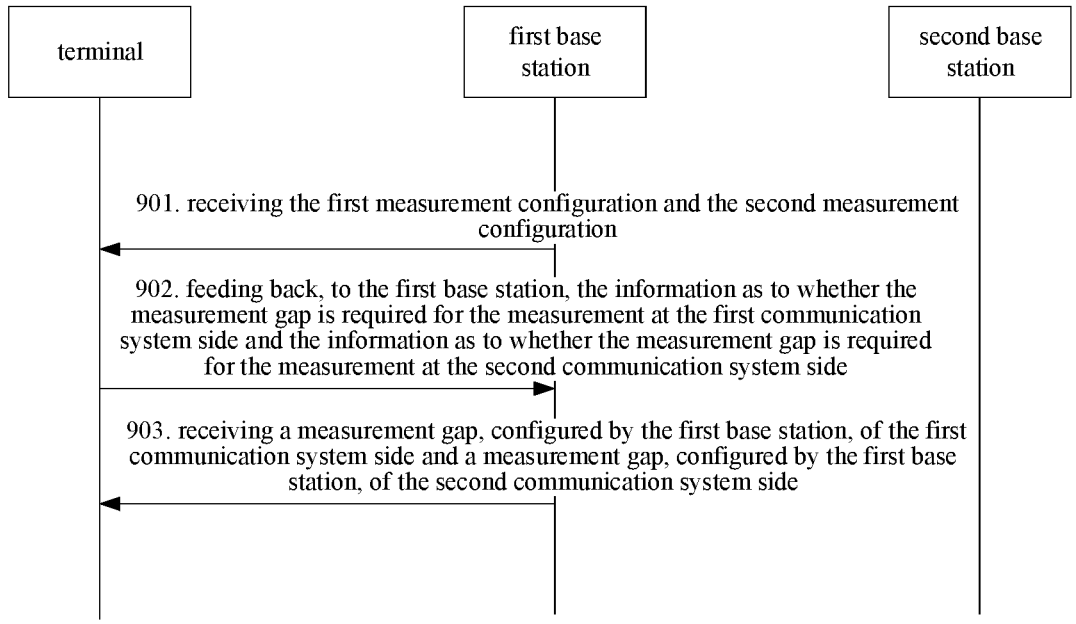
FIG. 9 is a flow diagram of a measurement configuration method provided by still another embodiment of the present disclosure.

FIG. 9 is a flow diagram of a measurement configuration method of a terminal of DC for different RATs provided by still another embodiment of the present disclosure. As shown in FIG. 9, the method includes following steps.

Step 901: receiving the first measurement configuration and the second measurement configuration transmitted by a first base station in the first communication system.

The first measurement configuration includes information of a frequency of a first communication system and a request to determine whether a measurement gap is required for the measurement of the frequency of the first communication system; and the second measurement configuration includes information of a frequency of a second communication system and a request to determine whether a measurement gap is required for the measurement of the frequency of the second communication system.

Step 902: feeding back, to the first base station, the information as to whether the measurement gap is required for the measurement of the frequency of the first communication system and the information as to whether the measurement gap is required for the measurement of the frequency of the second communication system.

Step 903: receiving a measurement gap, configured by the first base station, of the measurement of the frequency of the first communication system and a measurement gap, configured by the first base station, of the measurement of the frequency of the second communication system.

Figure 10:
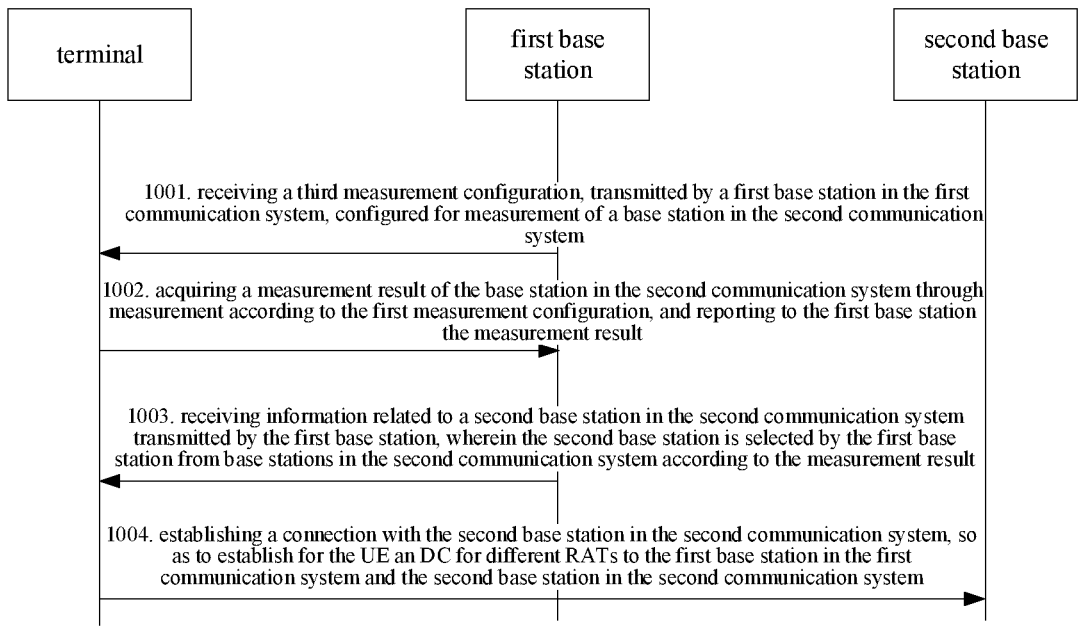
FIG. 10 is a flow diagram of a measurement configuration method provided by still another embodiment of the present disclosure.

Referring to FIG. 10, on the basis of FIG. 3, FIG. 4 or FIG. 9, the method further includes following steps.

Step 1001: receiving a third measurement configuration, transmitted by a first base station in the first communication system, configured for measurement of a base station in the second communication system.

The third measurement configuration includes frequency information of the second communication system and a measurement gap of the measurement of the frequency of the second communication system.

The receiving the third measurement configuration, transmitted by the first base station in the first communication system, configured for measurement of a base station in the second communication system includes: receiving frequency information of the second communication system and a request to determine whether a measurement gap is required for the measurement of the frequency of the second communication system transmitted by the first base station; transmitting, to the first base station, a feedback result as to whether a measurement gap is required for the measurement of the frequency of the second communication system; receiving a measurement gap of the measurement of the frequency of the second communication system transmitted by the first base station. The measurement gap of the measurement of the frequency of the second communication system is determined by the first base station according to the feedback result.

Step 1002: acquiring a measurement result of the base station in the second communication system through the measurement according to the first measurement configuration, and reporting to the first base station the measurement result.

Step 1003: receiving information related to a second base station in the second communication system transmitted by the first base station. The second base station is selected by the first base station from base stations in the second communication system according to the measurement result.

Step 1004: establishing a connection with the second base station in the second communication system, so as to establish for the UE a DC for different RATs to the first base station in the first communication system and the second base station in the second communication system.

In embodiments of the present disclosure, different RATs according to the DC for different RATs include a first communication system and a second communication system which employ different RATs. A first base station in the first communication system is a DC primary node, and a second base station in the second communication system is a DC secondary node.

A description is given below by taking a case in which the first communication system is an LTE system and the second communication system is a 5G NR system as an example. Correspondingly, the first base station is designated as eNB and the second base station is designated as gNB.

Figure 11:
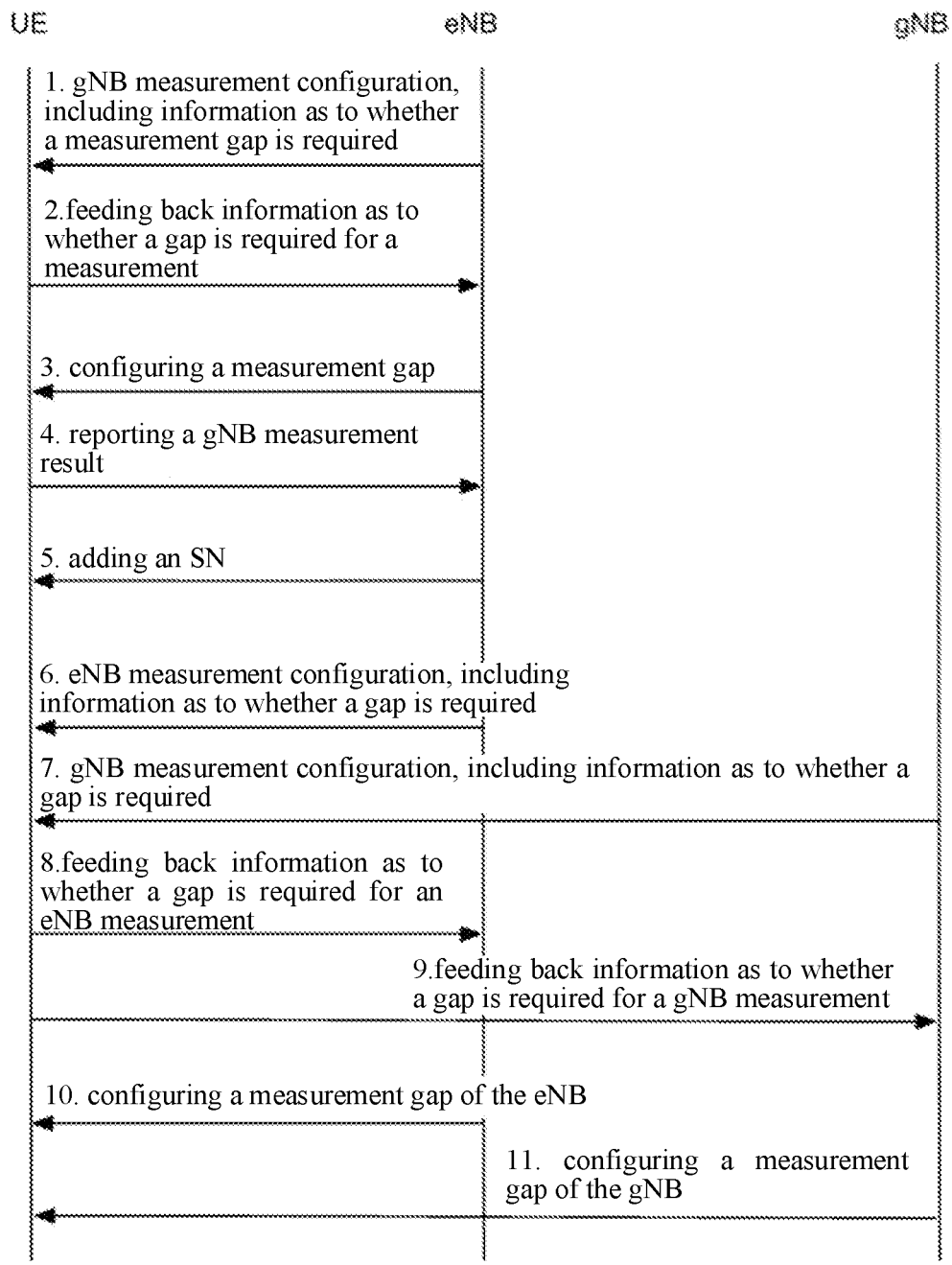
FIG. 11 illustrates a process of a measurement configuration method of a terminal provided with the DC between LTE and 5G NR according to an embodiment of the present disclosure.

Referring to FIG. 11, a process of a measurement configuration method of a terminal provided with DC between LTE system and 5G NR according to an embodiment is illustrated. The method has following specific steps.

Step 1: an eNB transmits a measurement configuration of a gNB to a UE (a terminal). The measurement configuration includes: information of an NR frequency, and a request to determine whether a measurement gap is required for measurement of corresponding NR frequency.

Step 2: the UE feeds back to the eNB on whether a measurement gap is required for the measurement of the NR frequency.

Step 3: the eNB configures a measurement gap for the UE.

Step 4: the UE reports to the eNB a measurement result of the gNB.

Step 5: the eNB selects for the UE an appropriate gNB as a secondary node (SN) to implement a DC for different RATs.

In the above step 1 to step 5, the eNB configures for the UE a measurement for different RATs and adds base stations of different RATs, to form DC for different RATs.

Step 6: the eNB transmits a measurement configuration generated by itself to the UE. The measurement configuration includes LTE frequency information and a request to determine whether a measurement gap is required for corresponding LTE frequency measurement.

Step 7: the gNB transmits a measurement configuration generated by itself to the UE. The measurement configuration includes NR frequency information and a request to determine whether a measurement gap is required for measurement of corresponding NR frequency.

It should be appreciated that, the order of performing the step 6 and the step 7 is not limited in this embodiment, that is, the step 7 may be performed before the step 6, or the step 6 and the step 7 may be performed simultaneously.

Step 8: the UE feeds back, to the eNB, information as to whether a measurement gap is required for LTE frequency measurement at LTE side.

Specifically, the UE feeds back on whether a measurement gap is required for measuring at an LTE frequency and whether a measurement gap is required for measuring at an NR frequency.

Step 9: the UE feeds back, to the gNB, information as to whether a measurement gap is required for NR frequency measurement at NR side.

Specifically, the UE feeds back on whether a measurement gap is required for measuring at an NR frequency and whether a measurement gap is required for measuring at an LTE frequency.

It should be appreciated that, the order of performing the step 8 and the step 9 is not limited in this embodiment, that is, the step 9 may be performed before the step 8, or the step 8 and the step 9 may be performed simultaneously.

Step 10: the eNB configures for the UE a measurement gap of the LTE side, which includes a measurement gap for measuring at an LTE frequency and a measurement gap for measuring at an NR frequency.

The two measurement gaps may be one measurement gap, and when no measurement gap is required, the length of the measurement gap may be set to 0.

Step 11: the gNB configures for the UE a measurement gap of the NR side, which includes a measurement gap for measuring at an NR frequency and a measurement gap for measuring at an LTE frequency.

The two measurement gaps may be one measurement gap, and when no measurement gap is required, the length of the measurement gap may be set to 0.

It should be appreciated that, the order of performing the step 10 and the step 11 is not limited in this embodiment, that is, the step 11 may be performed before the step 10, or the step 10 and the step 11 may be performed simultaneously.

When frequency information in the measurement configuration of eNB and/or gNB changes, the step 6 and/or step 7 are/is triggered, after the UE receives an updated measurement configuration, the UE determines whether current measurement gap configuration is appropriate. When the measurement gap configuration at LTE side and/or NR side is to be modified, the process of the step 8 to the step 11 is triggered.

Figure 12:
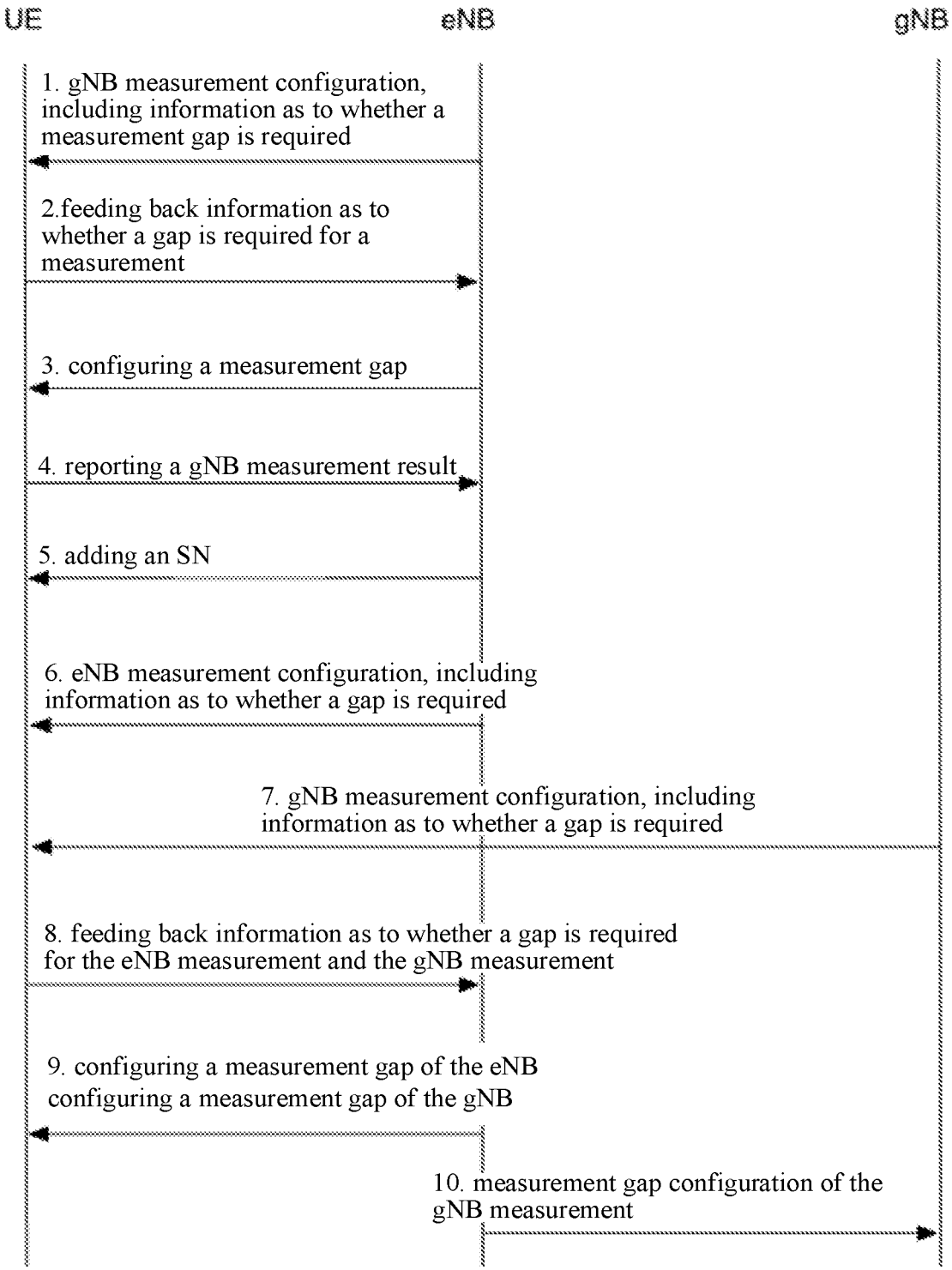
FIG. 12 illustrates a process of a measurement configuration method of a terminal provided with the DC between LTE and 5G NR according to another embodiment of the present disclosure.

Referring to FIG. 12, a process of a measurement configuration method of a terminal provided with a DC between LTE system and 5G NR according to another embodiment is illustrated. The method has following specific steps.

Step 1: an eNB transmits a measurement configuration of a gNB to UE. The measurement configuration includes: information of an NR frequency, and a request to determine whether a measurement gap is required for measurement of corresponding NR frequency.

Step 2: the UE feeds back to the eNB on whether a measurement gap is required for the measurement of the NR frequency.

Step 3: the eNB configures a measurement gap for the UE.

Step 4: the UE reports to the eNB a measurement result of the gNB.

Step 5: the eNB selects for the UE an appropriate gNB as a secondary node (SN) to implement the DC for different RATs.

In the above step 1 to step 5, the eNB configures for the UE a measurement for different RATs and adds base stations of different RATs, to form DC for different RATs.

Step 6: the eNB generates its own measurement configuration and transmits the measurement configuration to the UE. The measurement configuration includes LTE frequency information and a request to determine whether a measurement gap is required for corresponding LTE frequency measurement.

Step 7: the gNB transmits a measurement configuration generated by itself to the UE. The measurement configuration includes NR frequency information and a request to determine whether a measurement gap is required for corresponding frequency measurement.

It should be appreciated that, the order of performing the step 6 and the step 7 is not limited in this embodiment, that is, the step 7 may be performed before the step 6, or the step 6 and the step 7 may be performed simultaneously.

Step 8: the UE feeds back, to the eNB, information as to whether a measurement gap is required for LTE frequency measurement. The information includes information as to whether a measurement gap is required for measuring at an LTE frequency and information as to whether a measurement gap is required for measuring at an NR frequency. And the UE feeds back, to the eNB, information as to whether a measurement gap is required for NR frequency measurement. The information includes information as to whether a measurement gap is required for measuring at an LTE frequency and information as to whether a measurement gap is required for measuring at an NR frequency.

Step 9: the eNB configures for the UE a measurement gap of the LTE side, which includes a measurement gap for measuring at an LTE frequency and a measurement gap for measuring at an NR frequency. The two measurement gaps may be one measurement gap, and when no measurement gap is required, the length of the measurement gap is set to 0. The eNB configures for the UE a measurement gap of the NR side, which includes a measurement gap for measuring at an LTE frequency and a measurement gap for measuring at an NR frequency respectively. The two measurement gaps may be one measurement gap, and when no measurement gap is required, the length of the measurement gap may be set to 0.

Step 10: the eNB informs the measurement gap configuration of the NR side to the gNB.

The measurement gap configuration of the NR side includes a measurement gap for measuring at an LTE frequency and a measurement gap for measuring at an NR frequency. The two measurement gaps may be one measurement gap.

The measurement gap configuration of the NR side is transmitted via an interface between the eNB and the gNB, e.g., Xn interface. Further, the measurement gap configuration of the NR side may be transmitted via a route from the eNB to a core network, then from the core network to the gNB.

When frequency information in the measurement configuration of eNB and/or gNB changes, the step 6 and/or step 7 are/is triggered, after the UE receives an updated measurement configuration, the UE determines whether current measurement gap configuration is appropriate. When the measurement gap configuration is to be modified, the process of the step 8 to the step 10 is triggered.

Figure 13:
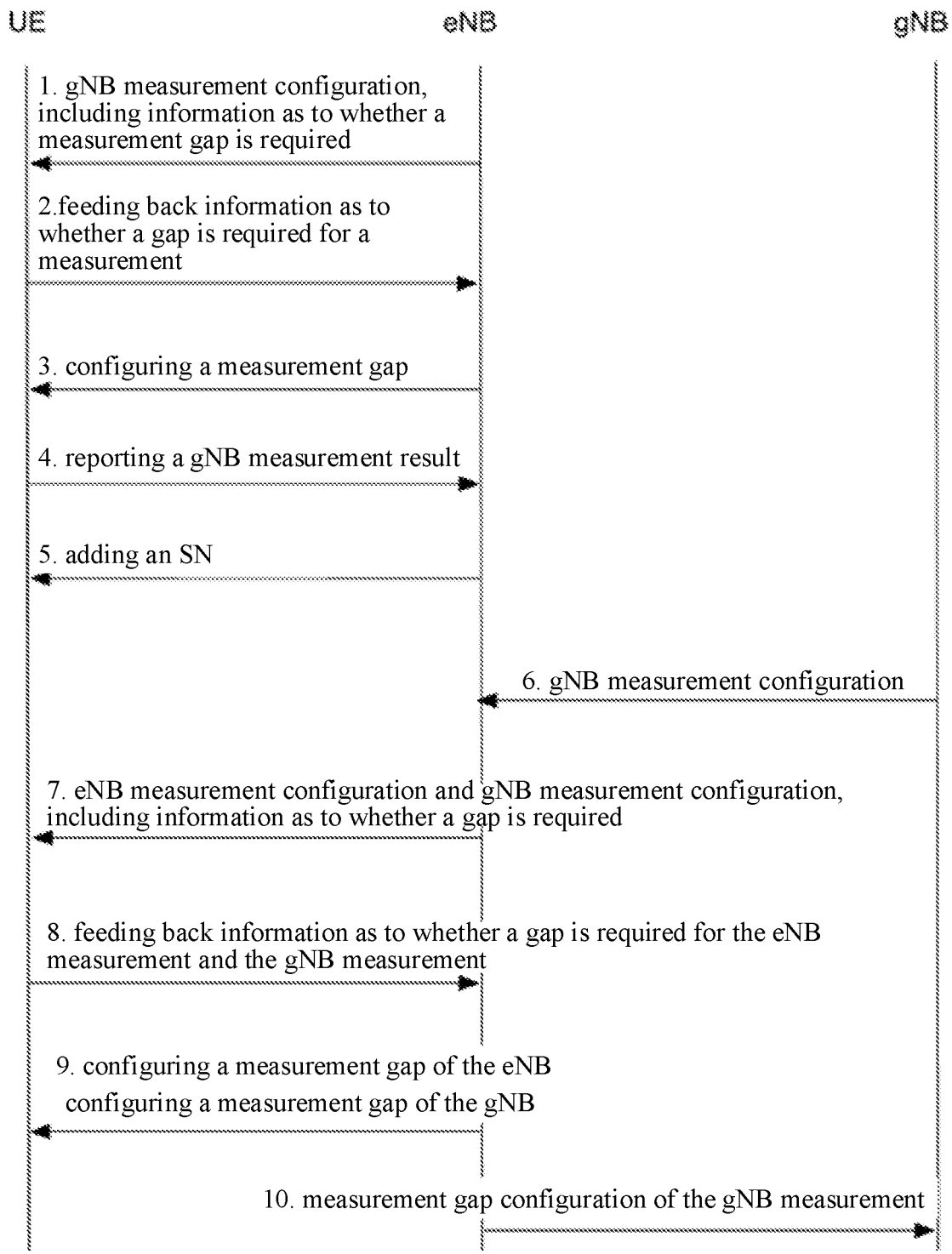
FIG. 13 illustrates a process of a measurement configuration method of a terminal provided with the DC between LTE and 5G NR according to another embodiment of the present disclosure.

According to the step 6 and step 7 in FIG. 11 and FIG. 12, the gNB generates the measurement configuration by itself and transmits the measurement configuration to the UE directly. Alternatively, the gNB may transmit the measurement configuration generated by itself to the UE via the eNB. Referring to FIG. 13, on the basis of FIG. 12, processes of step 6 and step 7 are as follows.

Step 6: the gNB generates a measurement configuration by itself. The measurement configuration is transmitted via an interface between the eNB and the gNB, e.g., Xn interface. Further, the measurement configuration may be transmitted via a route from the gNB to a core network, then from the core network to the eNB.

Step 7: the eNB transmits a measurement configuration generated by itself and a request to determine whether a measurement gap is required for corresponding frequency measurement to the UE, and the eNB transmits a measurement configuration generated by the gNB and a request to determine whether a measurement gap is required for corresponding frequency measurement to the UE.

The modifications to these two steps are also applicable to the process as shown in FIG. 11.

When the DC for different RATs is coupled with carrier aggregation, each DC system may further employ carrier aggregation. The addition of a CA secondary carrier may have an impact on the usage and configuration of the measurement gap, thus it is necessary for the primary base station and the secondary base station to re-negotiate and acquire the measurement capability of the terminal.

Figure 14:
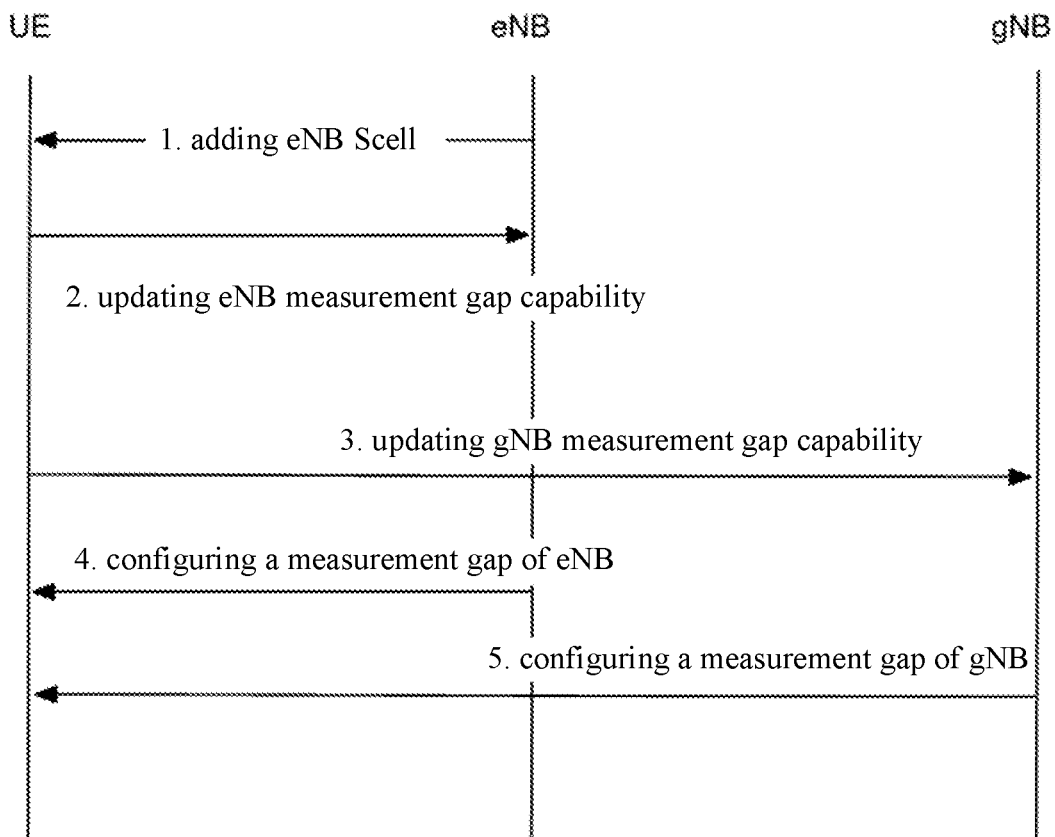
FIG. 14 illustrates a process of a measurement configuration method of a terminal provided with the DC between LTE and 5G NR in a carrier aggregation scenario according to an embodiment of the present disclosure.

Referring to FIG. 14, a process of a measurement configuration method of a terminal provided with the DC between LTE and 5G NR in a carrier aggregation scenario according to an embodiment is illustrated. The method has following specific steps.

Step 1: the eNB adds an LTE secondary carrier for the UE, to form a carrier aggregation within LTE.

In this embodiment, the UE is configured with dual connectivity between LTE and NR.

Step 2: after the new carrier is added, the UE feeds back, to the eNB, an update of measurement gap capability and a feedback is performed for each carrier independently.

Specifically, the UE feeds back, to the eNB, information as to whether a measurement gap is required for measuring the newly added secondary carrier at LTE side, and the information includes information as to whether a measurement gap is required for measuring at an LTE frequency and information as to whether a measurement gap is required for measuring at an NR frequency.

When the measurement gap capability with respect to a primary carrier changes, the UE feeds back, to the eNB, information update as to whether a measurement gap is required for measuring the original primary carrier at LTE side, and the information update includes information as to whether a measurement gap is required for measuring at an LTE frequency and information as to whether a measurement gap is required for measuring at an NR frequency.

Step 3: after a new carrier is added for the UE, when the measurement gap capability with respect to the NR side changes, the UE transmits, to the gNB, information update as to whether a measurement gap is required for the NR side, and the information update includes information as to whether a measurement gap is required for measuring at an LTE frequency and information as to whether a measurement gap is required for measuring at an NR frequency.

Step 4: the eNB configures for the UE, according to information updated by the UE, measurement gaps of two carriers at LTE side respectively, that is, a measurement gap configuration for measuring at an LTE frequency and a measurement gap configuration for measuring at an NR frequency. The two measurement gaps may be one measurement gap.

Step 5: the gNB configures for the UE, according to information updated by the UE, measurement gaps of the NR side respectively, that is, a measurement gap configuration for measuring at an LTE frequency and a measurement gap configuration for measuring at an NR frequency. The two measurement gaps may be one measurement gap.

It should be appreciated that, a process in the case that the secondary carrier is added by the gNB is the same as above, and a repeated description is omitted herein.

Figure 15:
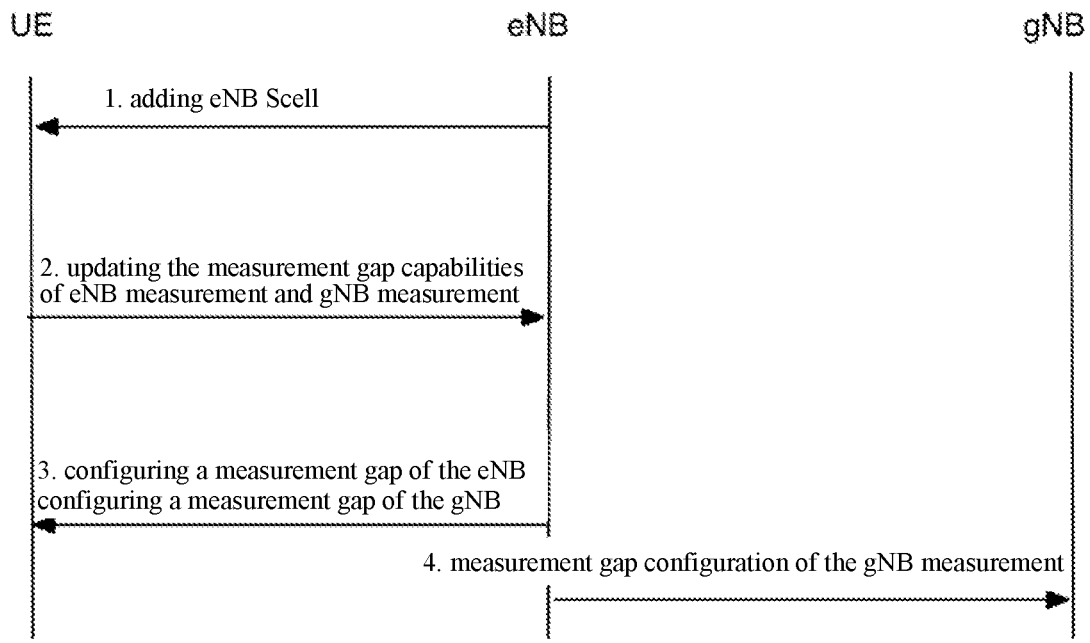
FIG. 15 illustrates a process of a measurement configuration method of a terminal provided with the DC between LTE and 5G NR in a carrier aggregation scenario according to another embodiment of the present disclosure.

Referring to FIG. 15, a process of a measurement configuration method of a terminal provided with DC for different RATs in a carrier aggregation scenario according to another embodiment is illustrated. The method has following specific steps.

Step 1: the eNB adds an LTE secondary carrier for the UE, to form a carrier aggregation within LTE.

Step 2: the UE is configured with dual connectivity between LTE and NR; after the new carrier is added, the UE feeds back, to the eNB, an update of measurement gap capability with respect to LTE side and a feedback is performed for each carrier independently.

Specifically, the UE feeds back, to the eNB, information as to whether a measurement gap is required for measuring the newly added secondary carrier at LTE side, and the information includes information as to whether a measurement gap is required for measuring at an LTE frequency and information as to whether a measurement gap is required for measuring at an NR frequency.

When the measurement gap capability with respect to a primary carrier changes, the UE feeds back, to the eNB, information update as to whether a measurement gap is required for measuring the original primary carrier at LTE side, and the information update includes information as to whether a measurement gap is required for measuring at an LTE frequency and information as to whether a measurement gap is required for measuring at an NR frequency.

After a new carrier is added for the UE, when the measurement gap capability with respect to the NR side changes, the UE feeds back, to the eNB, update of a measurement gap capability with respect to the NR side, and the update includes information as to whether a measurement gap is required for measuring at an LTE frequency and information as to whether a measurement gap is required for measuring at an NR frequency.

Step 3: the eNB configures for the UE, according to information updated by the UE, measurement gaps of two carriers at LTE side respectively, that is, a measurement gap configuration for measuring at an LTE frequency and a measurement gap configuration for measuring at an NR frequency. The two measurement gaps may be one measurement gap.

Step 4: the eNB configures for the UE, according to information updated by the UE, measurement gaps of the NR side, that is, a measurement gap configuration for measuring at an LTE frequency and a measurement gap configuration for measuring at an NR frequency. The two measurement gaps may be one measurement gap.

The eNB informs to the gNB the measurement gap configuration of the NR side after the update. The measurement gap configuration is transmitted via an interface between the eNB and the gNB, e.g., Xn interface. Further, the measurement gap configuration may be transmitted via a route from the eNB to a core network, then from the core network to the gNB.

A process in the case that the secondary carrier is added by the gNB is the same as above, and a repeated description is omitted herein. Another measurement configuration method is further provided in this embodiment, where the terminal receives a measurement configuration and a measurement gap configured by a network side, the measurement gap is determined by the network side according to the frequency bands and frequency band combinations supported by the terminal in various communication systems; finally the terminal performs measurement according to the received measurement configuration and measurement gap. The method has following specific steps.

Step 1: the UE receives measurement configuration information of the first communication system and a measurement configuration of the second communication system. The measurement configuration of the first communication system includes measurement frequency information of the first communication system. The measurement configuration of the second communication system includes measurement frequency information of the first communication system.

Step 2: the first communication system and the second communication system exchange measurement configurations.

The first communication system and the second communication system may transmit measurement configurations to each other via an interface between the two communication systems, for example, Xn interface, or may transmit measurement configurations via a route from the first communication system to a core network, then from the core network to the second communication system.

Step 3: the first communication system and the second communication system exchange information of frequency bands and information of frequency band combinations supported by the UE in respective communication systems.

The first communication system and the second communication system may deliver the information of frequency bands and the information of frequency band combinations to each other via an interface between the two communication systems, for example, Xn interface, or may transmit the information of frequency bands and frequency band combinations via a route from the first communication system to a core network, then from the core network to the second communication system.

Step 4: the UE receives a configured measurement gap of the measurement of the frequency of the first communication system, and a configured measurement gap of the measurement of the frequency of the second communication system. The measurement gaps of the two systems may be of one set, or may be of two different sets.

Step 5: the UE performs measurement according to the received measurement configuration and measurement gap.

Figure 16:
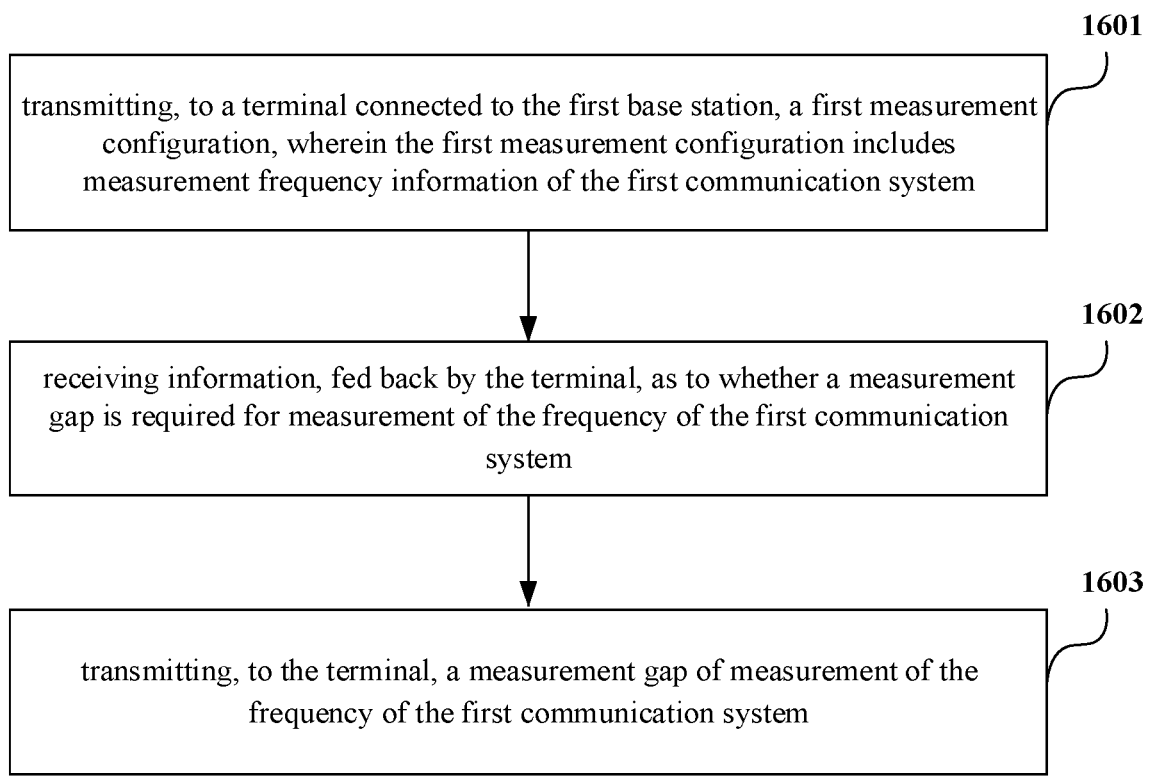
FIG. 16 is a flow diagram of a measurement configuration method for a base station side according to another embodiment of the present disclosure.

Referring to FIG. 16, a process of a measurement configuration method for a base station side is illustrated. The method includes following specific steps.

Step 1601: transmitting, to a terminal connected to the first base station, a first measurement configuration. The first measurement configuration includes measurement frequency information of the first communication system.

Step 1602: transmitting, to the terminal, a measurement gap of measurement of the frequency of the first communication system.

Optionally, continuing to refer to FIG. 16, before the step 1602, the method further includes: step 1603: receiving information, fed back by the terminal, as to whether a measurement gap is required for measurement of the frequency of the first communication system.

In this embodiment, optionally, the first measurement configuration further includes a request to determine whether a measurement gap is required for measurement of the frequency of the first communication system; the second measurement configuration further includes a request to determine whether a measurement gap is required for measurement of the frequency of the second communication system.

In this embodiment, optionally, the method further includes: transmitting, to a second base station that is in the second communication system and connected to the terminal, the first measurement configuration; receiving, from the second base station in the second communication system, a second measurement configuration, where the second measurement configuration includes measurement frequency information of the second communication system.

In this embodiment, optionally, the method further includes: transmitting, to a second base station that is in the second communication system and connected to the terminal, frequency band information and/or frequency band combination information supported by the terminal in the first communication system; receiving frequency band information and/or frequency band combination information supported by the terminal in the second communication system transmitted by the second base station in the second communication system.

In this embodiment, the terminal is capable of performing measurement according to the measurement gap and the received measurement configuration configured by the network side. The measurement gap may be determined by the terminal, or may be configured by the network side, thereby reducing effectively the signaling overhead associated with reporting the measurement capability by the terminal, and preventing the excessive signaling overhead resulting from the necessity for the terminal to report the measurement capability with respect to all supported frequency bands and frequency band combinations.

Figure 21:
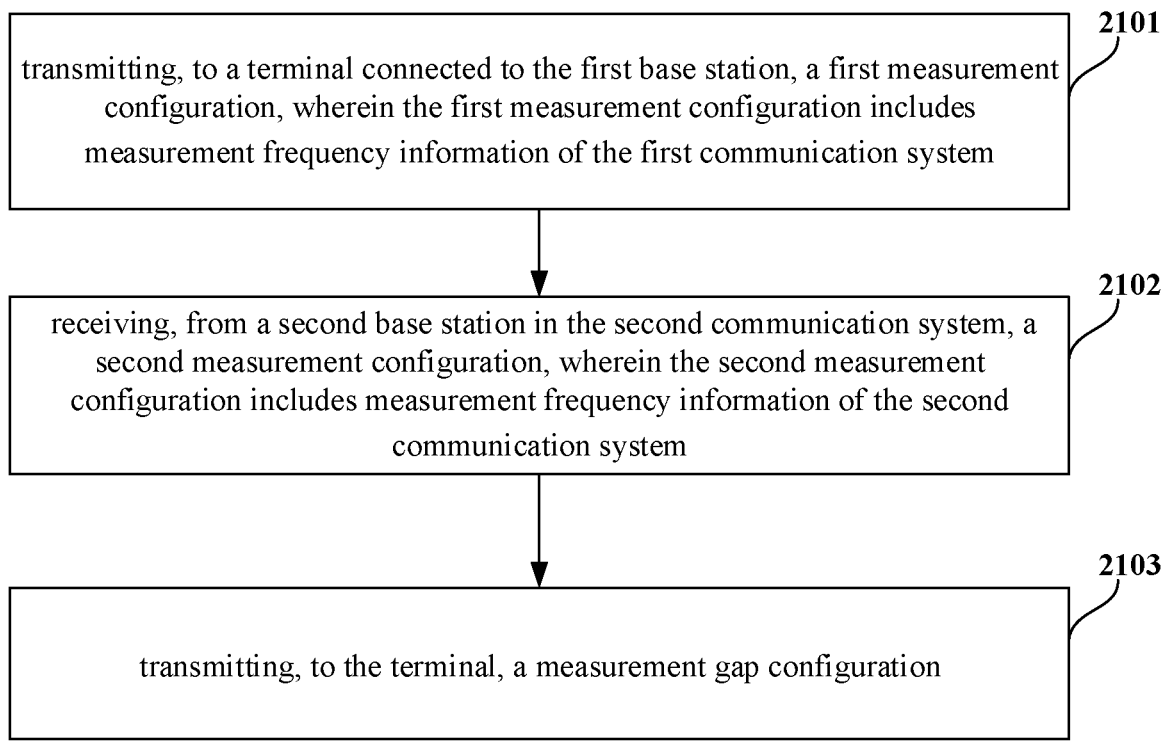
FIG. 21 is a flow diagram of a measurement configuration method for a base station side according to another embodiment of the present disclosure.

Referring to FIG. 21, a process of a measurement configuration method is illustrated. The method is performed by a first base station in a first communication system and has following specific steps.

Step 2101: transmitting, to a terminal connected to the first base station, a first measurement configuration. The first measurement configuration includes measurement frequency information of the first communication system.

Step 2102: receiving, from a second base station in a second communication system, a second measurement configuration. The second measurement configuration includes measurement frequency information of the second communication system.

Step 2103: transmitting, to the terminal, a measurement gap configuration.

Based on the same inventive concept, embodiments of the present disclosure further provide a terminal. The principle on which the terminal is based to solve the problem is similar to the principle on which the measurement configuration method of embodiments of the present disclosure as illustrated in FIG. 2 to FIG. 16 is based to solve the problem, thus for a implement of the terminal, a reference may be made to the implementation of the method, and a repeated description thereof is omitted.

Figure 17:
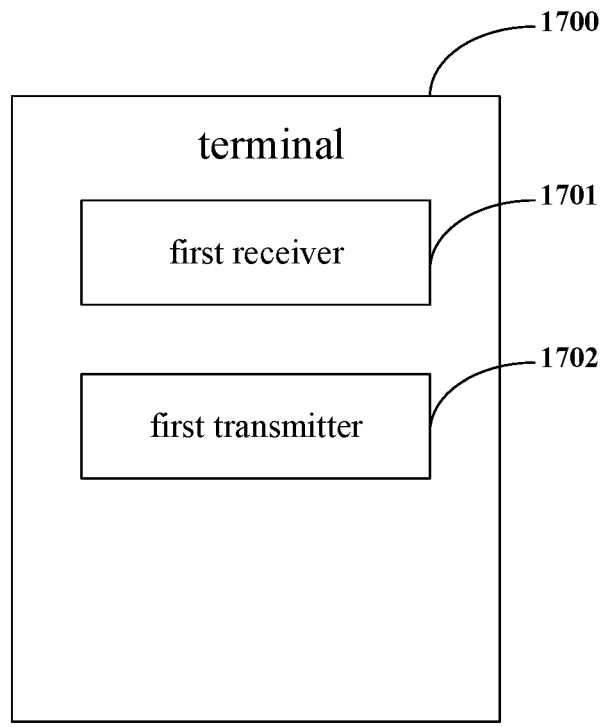
FIG. 17 is a schematic structural diagram of a terminal according to an embodiment of the present disclosure.

FIG. 17 is a schematic structural diagram of a terminal provided by an embodiment of the present disclosure. As shown in FIG. 17, the terminal 1700 includes: a first receiver 1701, the first receiver 1701 is configured to receive, from a network side, a first measurement configuration and a second measurement configuration, where the first measurement configuration includes information of a frequency of a first communication system and the second measurement configuration includes information of a frequency of a second communication system; the first receiver 1701 is further configured to receive a measurement gap of a measurement of the frequency of the first communication system and a measurement gap of a measurement of the frequency of the second communication system configured by the network side.

Optionally, continuing to refer to FIG. 17, the terminal 1700 further includes: a first transmitter 1702, configured to feed back, to the network side, information as to whether a measurement gap is required for the measurement of the frequency of the first communication system and information as to whether a measurement gap is required for the measurement of the frequency of the second communication system.

Optionally, the first measurement configuration further includes a request to determine whether a measurement gap is required for the measurement of the frequency of the first communication system, and the second measurement configuration further includes a request to determine whether a measurement gap is required for the measurement of the frequency of the second communication system.

Optionally, the first receiver 1701 is further configured to receive the first measurement configuration transmitted by a first base station in the first communication system and receive the second measurement configuration transmitted by a second base station in the second communication system; the first transmitter 1702 is further configured to feed back, to the first base station, the information as to whether the measurement gap is required for the measurement of the frequency of the first communication system and feed back, to the second base station, the information as to whether the measurement gap is required for the measurement of the frequency of the first communication system; the first receiver 1701 is further configured to receive a measurement gap, configured by the first base station, of the measurement of the frequency of the first communication system and receive a measurement gap, configured by the second base station, of the measurement of the frequency of the second communication system.

Optionally, the first receiver 1701 is further configured to receive the first measurement configuration transmitted by a first base station in the first communication system and receive the second measurement configuration transmitted by a second base station in the second communication system; the first transmitter 1702 is further configured to feed back, to the first base station, the information as to whether the measurement gap is required for the measurement of the frequency of the first communication system and the information as to whether the measurement gap is required for the measurement of the frequency of the second communication system; the first receiver 1701 is further configured to receive a measurement gap, configured by the first base station, of the measurement of the frequency of the first communication system and a measurement gap, configured by the first base station, of the measurement of the frequency of the second communication system.

Optionally, the first transmitter 1702 is further configured to, after a new carrier of the first communication system has been configured by the first base station for the terminal, feed back, to the first base station, first update information of a measurement gap capability with respect to measurement of a frequency of each carrier; the first receiver 1701 is further configured to receive a measurement gap, configured by the first base station for the terminal according to the first update information, of measurement of the frequency of every carrier at a first communication system side.

Optionally, the first transmitter 1702 is further configured to transmit, to the second base station, second update information as to whether a measurement gap is required at a second communication system side; the first receiver 1701 is further configured to receive a measurement gap, configured by the second base station for the terminal according to the second update information, of the measurement of the frequency of the second communication system.

Optionally, the first transmitter 1702 is further configured to transmit, to the first base station, third update information as to whether a measurement gap is required at a second communication system side; the first receiver 1701 is further configured to receive a measurement gap, configured by the first base station for the terminal according to the third update information, of the measurement of the frequency of the second communication system.

Optionally, the first receiver 1701 is further configured to receive the first measurement configuration and the second measurement configuration transmitted by a first base station in the first communication system; the first transmitter 1702 is further configured to feed back, to the first base station, the information as to whether the measurement gap is required for the measurement of the frequency of the first communication system and the information as to whether the measurement gap is required for the measurement of the frequency of the second communication system; the first receiver 1701 is further configured to receive a measurement gap, configured by the first base station, of the measurement of the frequency of the first communication system and a measurement gap, configured by the first base station, of the measurement of the frequency of the second communication system.

Optionally, the first receiver 1701 is further configured to receive a third measurement configuration, transmitted by a first base station in the first communication system, configured for measurement of at least a portion of base stations in the second communication system; the first transmitter 1702 is further configured to acquire a measurement result of at least the portion of base stations in the second communication system through the measurement according to the third measurement configuration, and report to the first base station the measurement result; the first receiver 1701 is further configured to receive information related to a second base station in the second communication system transmitted by the first base station, the second base station is selected by the first base station from at least the portion of base stations in the second communication system according to the measurement result; and establish a connection with the second base station in the second communication system, so as to establish for the terminal a DC for different RATs to the first base station in the first communication system and the second base station in the second communication system.

Optionally, the first receiver 1701 is further configured to receive the information of the frequency of the second communication system and a request to determine whether a measurement gap is required for the measurement of the frequency of the second communication system transmitted by the first base station; the first transmitter 1702 is further configured to transmit, to the first base station, a feedback result as to whether a measurement gap is required for the measurement of the frequency of the second communication system; the first receiver 1701 is further configured to receive a measurement gap of the measurement of the frequency of the second communication system transmitted by the first base station, the measurement gap of the measurement of the frequency of the second communication system is determined by the first base station according to the feedback result.

The terminal provided by this embodiment may implement the aforementioned method embodiments and has similar implementation principle and technical effect, thus a repeated description thereof is omitted herein.

Based on the same inventive concept, embodiments of the present disclosure further provide a first base station. The principle on which the first base station is based to solve the problem is similar to the principle on which the measurement configuration method of embodiments of the present disclosure as illustrated in FIG. 2 to FIG. 16 is based to solve the problem, thus for a implement of the first base station, a reference may be made to the implementation of the method, and a repeated description thereof is omitted.

Figure 18:
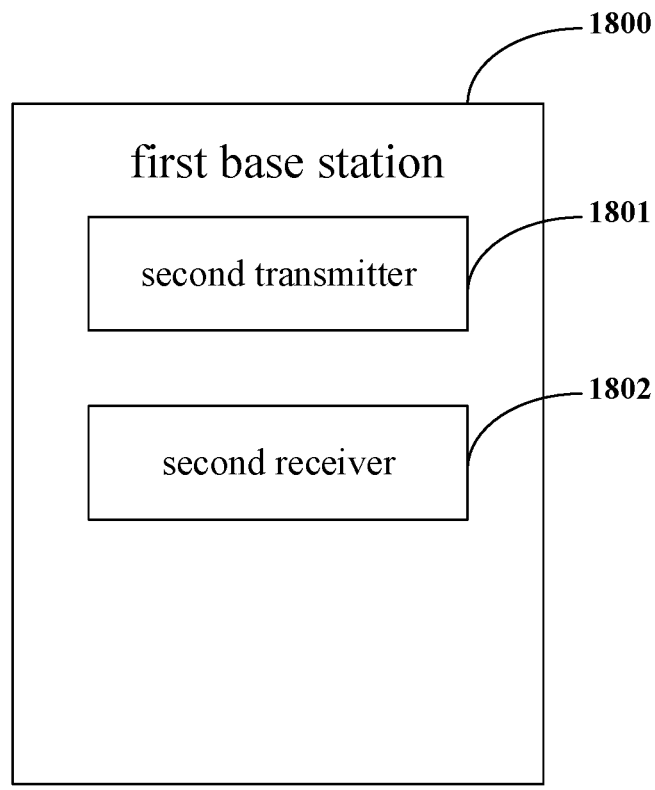
FIG. 18 is a schematic structural diagram of a base station according to an embodiment of the present disclosure.

Referring to FIG. 18, a structure of the first base station is illustrated. The first base station 1800 includes: a second transmitter 1801, configured to transmit, to a terminal connected to the first base station, a first measurement configuration, where the first measurement configuration includes measurement frequency information of the first communication system; the second transmitter 1801 is further configured to transmit, to the terminal, a measurement gap of measurement of the frequency of the first communication system.

Optionally, continuing to refer to FIG. 18, the first base station 1800 further includes: a second receiver 1802, configured to receive information, fed back by the terminal, as to whether a measurement gap is required for measurement of the frequency of the first communication system.

Optionally, the first measurement configuration further includes a request to determine whether a measurement gap is required for measurement of the frequency of the first communication system. The second measurement configuration further includes a request to determine whether a measurement gap is required for measurement of the frequency of the second communication system.

Optionally, the second transmitter is further configured to transmit, to a second base station that is in a second communication system and connected to the terminal, the first measurement configuration; the second receiver is further configured to receive, from the second base station in the second communication system, a second measurement configuration, where the second measurement configuration includes measurement frequency information of the second communication system.

Optionally, the second transmitter 1801 is further configured to transmit, to a second base station that is in a second communication system and connected to the terminal, the first measurement configuration; the second receiver 1802 is further configured to receive a second measurement configuration from a second base station in the second communication system, the second measurement configuration includes measurement frequency information of the second communication system.

Optionally, the second transmitter 1801 is further configured to transmit, to a second base station that is in a second communication system and connected to the terminal, frequency band information and/or frequency band combination information supported by the terminal in the first communication system; the second receiver 1802 is further configured to receive frequency band information and/or frequency band combination information supported by the terminal in the second communication system transmitted by the second base station in the second communication system.

The first base station provided by this embodiment may implement the aforementioned method embodiments and has similar implementation principle and technical effect, thus a repeated description thereof is omitted herein.

Based on the same inventive concept, embodiments of the present disclosure further provide a first base station. The principle on which the first base station is based to solve the problem is similar to the principle on which the measurement configuration method of embodiments of the present disclosure as illustrated in FIG. 2 to FIG. 16 is based to solve the problem, thus for a implement of the first base station, a reference may be made to the implementation of the method, and a repeated description thereof is omitted.

Figure 22:
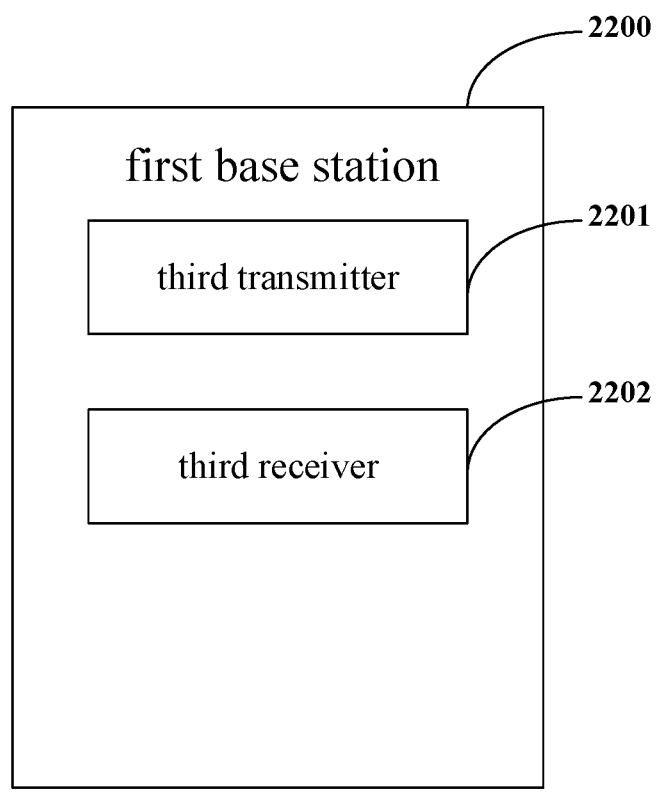
FIG. 22 is a schematic structural diagram of a base station according to another embodiment of the present disclosure.

Referring to FIG. 22, a structure of the first base station is illustrated. The first base station 2200 includes: a third transmitter 2201, configured to transmit, to a terminal connected to the first base station, a first measurement configuration, the first measurement configuration includes measurement frequency information of the first communication system; a third receiver 2202, configured to receive, from a second base station in a second communication system, a second measurement configuration, the second measurement configuration includes measurement frequency information of the second communication system; the third transmitter 2201 is further configured to transmit, to the terminal, a measurement gap configuration.

It should be appreciated that, the first base station may be a primary base station or a secondary base station.

Schematic hardware structural diagrams of a terminal and a base station are further provided hereinafter.

Figure 19:
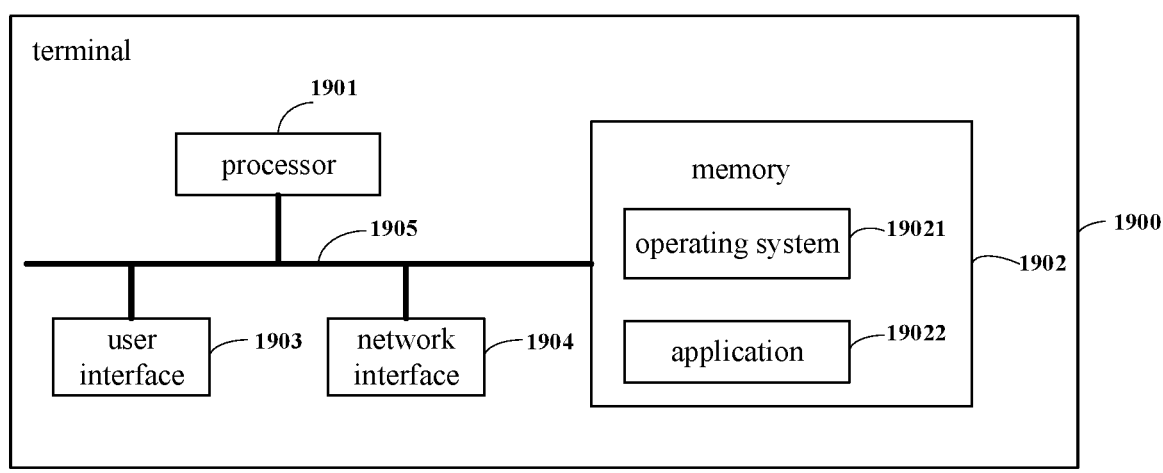
FIG. 19 is a schematic structural diagram of a terminal according to another embodiment of the present disclosure.

FIG. 19 is a schematic structural diagram of a terminal provided by another embodiment of the present disclosure. As shown in FIG. 19, the terminal 1900 includes: at least one processor 1901, a memory 1902, at least one network interface 1904 and a user interface 1903. Various components in the terminal 1900 are coupled to each other by a bus system 1905. It is understood, the bus system 1905 is configured to enable connection and communication between these components. In addition to data bus, the bus system 1905 includes a power bus, a control bus and a status signal bus. For clarity, various buses are all labeled as the bus system 1905 in FIG. 10.

The user interface 1903 may include a display, a keyboard or click device (e.g., a mouse), a trackball, a touchpad, or a touch screen, etc.

It is understood, the memory 1902 in the embodiments of the present disclosure may be a volatile or non-volatile memory, or may include both. The non-volatile memory may be a read-only memory (ROM), a programmable ROM (PROM), an erasable PROM (EPROM), an electrically EPROM (EEPROM) or a flash memory. The volatile memory may be a random access memory (RAM), which is used as an external cache. By way of example and without any limitation, many forms of RAMs may be used, such as static RAM (SRAM), dynamic RAM (DRAM), synchronous DRAM (SDRAM), double data rate SDRAM (DDRSDRAM), enhanced SDRAM (ESDRAM), Synchlink DRAM (SLDRAM) and direct Rambus RAM (DRRAM). The memory 1902 in the system and method described in the embodiments of the present disclosure is meant to include, without limitation, these and any other suitable types of storages.

In some implementations, the memory 1902 stores following elements: executable module or data structure, or a subset or extension set thereof, such as an operating system 19021 and an application 19022.

The operating system 19021 includes various system programs, such as framework layer programs, core library layer programs and driver layer programs, to implement various fundamental services and process hardware-based tasks. The application 19022 includes various applications, such as media player and browser, to implement a variety of application services. The program implementing the method according to embodiments of the present disclosure may be included in the application 19022.

In embodiments of the present disclosure, by calling program or instructions stored in the memory 1902, specifically, program or instructions stored in the application 19022, the processor 1901 may implement the aforementioned method performed by the terminal.

The method disclosed by the embodiments of the present disclosure is applicable to the processor 1901, or may be implemented by the processor 1901. The processor 1901 may be an integrated circuit (IC) chip capable of processing signals. During implementation, the steps of the aforementioned method may be performed in form of hardware by integrated logic circuit in the processor 1901 or in form of software by instructions. The processor 1901 may be a general purpose processor, digital signal processor (DSP), application specific integrated circuit (ASIC), field programmable gate array (FPGA) or other programmable logic device, discrete gate or transistor logic device, discrete hardware component, that is capable of implementing or executing the various methods, steps and logic block diagrams disclosed in the embodiments of the present disclosure. The general purpose processor may be a microprocessor, or any conventional processor, etc. The steps of the methods disclosed with reference to the embodiments of the present disclosure may be embodied in hardware in the form of a coding processor, or performed by the hardware in the coding processor and the software modules in combination. The software modules may reside in well-established storage medium in the art, such as a RAM, flash memory, ROM, PROM or EEPROM, register, etc. The storage medium resides in the memory 1902. The processor 1901 reads information from the memory 1902 and performs the steps of the methods with its hardware.

It is understood, the embodiments described in the present disclosure may be implemented by hardware, software, firmware, middleware, microcode or a combination thereof. For hardware implementation, processing units may be implemented in one or more application specific integrated circuits (ASIC), digital signal processor (DSP), DSP device (DSPD), programmable logic device (PLD), field-programmable gate array (FPGA), general purpose processor, controller, microcontroller, microprocessor, other electronic unit configured to perform the function described in this disclosure or a combination thereof.

For software implementation, the technical solution described in the embodiments of the present disclosure may be implemented by a module (e.g., process, function, etc.) configured to perform the function described in the embodiments of the present disclosure. Software code may be stored in a memory and executed by the processor. The memory may be implemented internal or external to the processor.

Specifically, the processor 1901 may call program or instructions stored in the memory 1902, to implement the method performed by the terminal of the aforementioned method embodiments.

Figure 20:
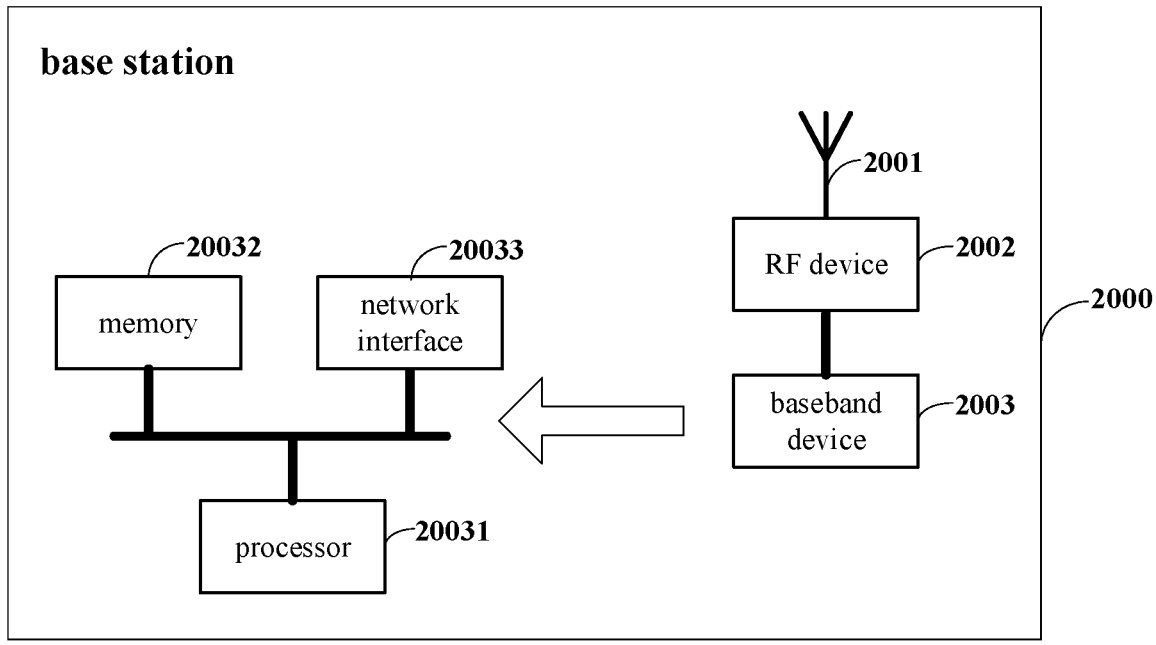
FIG. 20 is a schematic structural diagram of a base station according to another embodiment of the present disclosure.

FIG. 20 is a schematic structural diagram of a base station provided by an embodiment of the present disclosure. As shown in FIG. 20, the base station 2000 includes: an antenna 2001, a radio frequency (RF) device 2002, and a baseband device 2003. The antenna 2001 is connected to the RF device 2002. In an uplink direction, the RF device 2002 receives information via the antenna 2001 and delivers the received information to the baseband device 2003 for processing. In a downlink direction, the baseband device 2003 processes information to be transmitted and delivers the information to the RF device 2002, and the RF device 2002 processes and transmits the received information via the antenna 2001.

The frequency band processing device may reside in the baseband device 2003, and the method performed by the base station according to the aforementioned embodiments may be implemented in the baseband device 2003. The baseband device 2003 includes a processor 20031 and a memory 20032.

The baseband device 2003 may for example include at least one baseband processing board which is provided with multiple chips, as shown in FIG. 11, one of the chips is the processor 20031. The processor 20031 is connected to the memory 20032 to call program in the memory 20032, so as to implement the operations of the base station as described with respect to the method embodiments.

The baseband device 2003 may further include a network interface 20033 configured to exchange information with the RF device 2002. For example, the network interface is a common public radio interface (CPRI).

The processor may refer to one processor or refer to multiple processing elements collectively. For example, the processor may be a CPU, ASIC or one or more ICs configured to implement the method performed by the base station as described above, such as one or more DSPs or one or more FPGAs. A storage element may be one memory or may refer to multiple storage elements collectively.

The memory 20032 may be a volatile or non-volatile memory, or may include both. The non-volatile memory may be a read-only memory (ROM), a programmable ROM (PROM), an erasable PROM (EPROM), an electrically EPROM (EEPROM) or a flash memory. The volatile memory may be a random access memory (RAM), which is used as an external cache. By way of example and without any limitation, many forms of RAMs may be used, such as static RAM (SRAM), dynamic RAM (DRAM), synchronous DRAM (SDRAM), double data rate SDRAM (DDRSDRAM), enhanced SDRAM (ESDRAM), Synchlink DRAM (SLDRAM) and direct Rambus RAM (DRRAM). The memory 20032 described in the present disclosure is meant to include, without limitation, these and any other suitable types of memories.

In particular, the processor 20031 calls the program in the memory 20032 to implement the method performed by the first base station or second base station in the embodiments.

Embodiments of the present disclosure further provide a computer readable storage medium. The computer readable storage medium stores therein a data transmission program, and the data transmission program is configured to be executed by a processor, to implement steps of the aforementioned access control method.

The terminal provided by this embodiment may implement the aforementioned method embodiments and has similar implementation principle and technical effect, thus a repeated description thereof is omitted herein.

It is understood, "one embodiment" or "an embodiment" mentioned throughout the specification means specific features, structures or characteristics related to the embodiment are included in at least one embodiment of the present disclosure. Therefore, "in one embodiment" or "in an embodiment" mentioned throughout the specification does not necessarily refer to the same embodiment. Additionally, these specific features, structures or characteristics may be combined in any suitable manner in one or more embodiments.

In various embodiments of the present disclosure, it is understood, the numbering of various processes is not intended to imply an execution sequence. The execution sequence of the processes should be determined in accordance with the functions and inherent logic thereof, and by no means constitutes any limitation as to the implementation of the embodiments of the present disclosure.

Additionally, the terms "system" and "network" are often interchangeable herein.

It is understood, the term "and/or" as used herein merely refers to an association relationship between objects to be associated and means there are three possibilities. For example, A and/or B may represent: only A exists, both A and B exist, and only B exists. Additionally, the symbol "I" as used herein generally represents there is a "or" relationship between the objects to be associated.

In the embodiments provided in this application, it is understood, expression "B corresponding to A" represents that B is associated with A and B may be determined according to A. However, it is further understood, B being determined according to A does not mean B is determined exclusively according to A, rather, B may be determined according to A and/or other information.

In the several embodiments provided in this application, it should be understood that the disclosed method and device may be implemented in other manners. For example, the described device embodiment is merely exemplary. For example, the unit division is merely logical function division and may be other division in actual implementation. For example, a plurality of units or components may be combined or integrated into another system, or some features may be neglected or not performed. In addition, the displayed or discussed mutual couplings or direct couplings or communication connections may be implemented through some interfaces. The indirect couplings or communication connections between the devices or units may be implemented in electrical, mechanical, or other forms.

In addition, various functional units in the embodiments of the present disclosure may be integrated into one processing unit, or each of the units may exist alone physically. Alternatively, two or more units may be integrated into one unit. The above integrated unit may be implemented in form of hardware, or may be implemented in form of a combination of hardware and software functional unit.

The integrated units implemented in form of software functional unit may be stored in a computer-readable storage medium. The software functional unit is stored in a storage medium, and includes several instructions for instructing a computer device (which may be a personal computer, a server, or a network device) to perform a part of the steps of the transmitting and receiving methods described in the embodiments of the present disclosure. The foregoing storage medium includes any medium that can store program code, such as a Universal Serial Bus (USB) flash drive, a removable hard disk, a ROM, a RAM, a magnetic disk, or an optical disc.

The above descriptions merely describe optional implementations of the present disclosure. It is appreciated, modifications and improvements may be made by a person of ordinary skill in the art without departing from the principle of the present disclosure, and these modifications and improvements shall fall within the scope of the present disclosure.

What is claimed is:

1. A measurement configuration method applied to a terminal, comprising:
receiving, from a network side, a first measurement configuration and a second measurement configuration, wherein the first measurement configuration comprises measurement frequency information of a first communication system, and the second measurement configuration comprises measurement frequency information of a second communication system;
feeding back, to the network side, information as to whether a measurement gap is required for measurement of a frequency of the first communication system, and information as to whether a measurement gap is required for measurement of a frequency of the second communication system;
receiving, from the network side, a measurement gap configuration.

2. The measurement configuration method according to claim 1, wherein
the first measurement configuration further comprises a request to determine whether a measurement gap is required for the measurement of the frequency of the first communication system, and the second measurement configuration further comprises a request to determine whether a measurement gap is required for the measurement of the frequency of the second communication system.

3. The measurement configuration method according to claim 1, wherein the receiving, from the network side, the first measurement configuration and the second measurement configuration comprises:
receiving the first measurement configuration transmitted by a first base station in the first communication system, and receiving the second measurement configuration transmitted by a second base station in the second communication system;
the feeding back, to the network side, the information as to whether the measurement gap is required for the measurement of the frequency of the first communication system, and the information as to whether the measurement gap is required for the measurement of the frequency of the second communication system comprises:
feeding back, to the first base station, the information as to whether the measurement gap is required for the measurement of the frequency of the first communication system, and feeding back, to the second base station, the information as to whether the measurement gap is required for the measurement of the frequency of the first communication system;
the receiving, from the network side, the measurement gap configuration comprises:
receiving a measurement gap, configured by the first base station, of the measurement of the frequency of the first communication system, and receiving a measurement gap, configured by the second base station, of the measurement of the frequency of the second communication system.

4. The measurement configuration method according to claim 3, further comprising:
after a previously presented carrier of the first communication system has been configured by the first base station for the terminal, feeding back, to the first base station, first update information of a measurement gap capability with respect to measurement of a frequency of each carrier;
receiving a measurement gap, configured by the first base station for the terminal according to the first update information, of the measurement of the frequency of each carrier at a first communication system side.

5. The measurement configuration method according to claim 4, wherein when a measurement gap capability with respect to measurement of a frequency of a carrier at a second communication system side changes, the measurement configuration method further comprises:
transmitting, to the second base station, second update information as to whether a measurement gap is required for the measurement of the frequency of the second communication system;
receiving a measurement gap, configured by the second base station for the terminal according to the second update information, of the measurement of the frequency of the second communication system.

6. The measurement configuration method according to claim 4, wherein when a measurement gap capability with respect to measurement of a frequency of a carrier at a second communication system side changes, the measurement configuration method further comprises:
transmitting, to the first base station, third update information as to whether a measurement gap is required for the measurement of the frequency of the second communication system;
receiving a measurement gap, configured by the first base station for the terminal according to the third update information, of the measurement of the frequency of the second communication system.

7. The measurement configuration method according to claim 1, wherein the receiving, from the network side, the first measurement configuration and the second measurement configuration comprises:
receiving the first measurement configuration transmitted by a first base station in the first communication system, and receiving the second measurement configuration transmitted by a second base station in the second communication system;
the feeding back, to the network side, the information as to whether the measurement gap is required for the measurement of the frequency of the first communication system, and the information as to whether the measurement gap is required for the measurement of the frequency of the second communication system comprises:
feeding back, to the first base station, the information as to whether the measurement gap is required for the measurement of the frequency of the first communication system, and the information as to whether the measurement gap is required for the measurement of the frequency of the second communication system;
the receiving, from the network side, the measurement gap configuration comprises:
receiving a measurement gap, configured by the first base station, of the measurement of the frequency of the first communication system, and a measurement gap, configured by the first base station, of the measurement of the frequency of the second communication system.

8. The measurement configuration method according to claim 1, wherein the receiving, from the network side, the first measurement configuration and the second measurement configuration comprises:
receiving the first measurement configuration and the second measurement configuration transmitted by a first base station in the first communication system;
the feeding back, to the network side, the information as to whether the measurement gap is required for the measurement of the frequency of the first communication system, and the information as to whether the measurement gap is required for the measurement of the frequency of the second communication system comprises:
feeding back, to the first base station, the information as to whether the measurement gap is required for the measurement of the frequency of the first communication system, and the information as to whether the measurement gap is required for the measurement of the frequency of the second communication system;
the receiving, from the network side, the measurement gap configuration comprises:
receiving a measurement gap, configured by the first base station, of the measurement of the frequency of the first communication system, and a measurement gap, configured by the first base station, of the measurement of the frequency of the second communication system.

9. The measurement configuration method according to claim 1, further comprising:
receiving a third measurement configuration, transmitted by a first base station in the first communication system, configured for measurement of at least a portion of base stations in the second communication system;
acquiring a measurement result of at least the portion of base stations in the second communication system through the measurement according to the third measurement configuration, and reporting to the first base station the measurement result;
receiving information related to a second base station in the second communication system transmitted by the first base station, wherein the second base station is selected by the first base station from at least the portion of base stations in the second communication system according to the measurement result;
establishing a connection with the second base station in the second communication system, to establish, for the terminal, a dual connectivity (DC) to the first base station in the first communication system and the second base station in the second communication system.

10. The measurement configuration method according to claim 9, wherein the third measurement configuration comprises the measurement frequency information of the second communication system and a measurement gap of the measurement of the frequency of the second communication system;
the receiving the third measurement configuration, transmitted by the first base station in the first communication system, configured for the measurement of at least the portion of base stations in the second communication system comprises:
receiving the measurement frequency information of the second communication system and a request to determine whether a measurement gap is required for measurement of a corresponding frequency transmitted by the first base station;
transmitting, to the first base station, a feedback result as to whether the measurement gap is required for the measurement of the frequency of the second communication system;
receiving a measurement gap of the measurement of the frequency of the second communication system transmitted by the first base station, wherein the measurement gap of the measurement of the frequency of the second communication system is determined by the first base station according to the feedback result.

11. A terminal, comprising: a memory, a processor and a computer program stored in the memory and configured to be executed by the processor, wherein the processor is configured to execute the computer program, to implement steps of the measurement configuration method according to claim 1.

12. A measurement configuration method applied to a first base station in a first communication system, comprising:
transmitting, to a terminal connected to the first base station, a first measurement configuration, wherein the first measurement configuration comprises measurement frequency information of the first communication system;
transmitting, to the terminal, a measurement gap configuration;
receiving information, fed back by the terminal, as to whether a measurement gap is required for measurement of a frequency of the first communication system;
transmitting, to a second base station that is in a second communication system and connected to the terminal, the first measurement configuration;
receiving, from the second base station in the second communication system, a second measurement configuration, wherein the second measurement configuration comprises measurement frequency information of the second communication system.

13. The measurement configuration method according to claim 12, wherein the first measurement configuration further comprises a request to determine whether a measurement gap is required for the measurement of the frequency of the first communication system.

14. The measurement configuration method according to claim 12, further comprising:
transmitting, to the second base station, frequency band information and/or frequency band combination information supported by the terminal in the first communication system;
receiving frequency band information and/or frequency band combination information supported by the terminal in the second communication system transmitted by the second base station in the second communication system.

15. A base station, comprising: a memory, a processor and a computer program stored in the memory and configured to be executed by the processor, wherein the processor is configured to execute the computer program, to implement steps of the measurement configuration method according to claim 12.

* * * * *